United States Patent
Yamada et al.

(10) Patent No.: US 8,765,323 B2
(45) Date of Patent: Jul. 1, 2014

(54) MEMBRANE ELECTRODE ASSEMBLY AND FUEL CELL WITH DENDRITIC SHAPE CATALYST LAYER

(75) Inventors: Kazuhiro Yamada, Yokohama (JP); Kazuya Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 12/303,843

(22) PCT Filed: Jun. 6, 2008

(86) PCT No.: PCT/JP2008/060810
§ 371 (c)(1),
(2), (4) Date: Dec. 8, 2008

(87) PCT Pub. No.: WO2008/153113
PCT Pub. Date: Dec. 18, 2008

(65) Prior Publication Data
US 2010/0221635 A1    Sep. 2, 2010

(30) Foreign Application Priority Data
Jun. 12, 2007    (JP) .................. 2007-155375

(51) Int. Cl.
*H01M 8/10*    (2006.01)
*H01M 4/86*    (2006.01)
*H01M 4/88*    (2006.01)
*H01M 4/92*    (2006.01)

(52) U.S. Cl.
CPC .......... *H01M 4/8605* (2013.01); *H01M 4/8657* (2013.01); *H01M 4/8885* (2013.01); *H01M 8/1004* (2013.01); *H01M 8/1039* (2013.01); *H01M 4/92* (2013.01)
USPC ......................... 429/480; 429/483

(58) Field of Classification Search
CPC ............ H01M 4/8605; H01M 4/8626; H01M 4/8657; H01M 4/8878–4/8885; H01M 4/92; H01M 8/1004; H01M 8/1018; H01M 8/1039
USPC ........................................... 502/100
See application file for complete search history.

(56) References Cited

U.S. PATENT DOCUMENTS

| 6,827,748 B2 | 12/2004 | Yamaura et al. |
| 6,991,870 B2 | 1/2006 | Yasumoto et al. |

(Continued)

FOREIGN PATENT DOCUMENTS

| JP | 2002-270187 A | 9/2002 |
| JP | 2004-039474 A | 2/2004 |

(Continued)

OTHER PUBLICATIONS

Machine translation of Arishima et al. JP 2005-353541 A.*

(Continued)

*Primary Examiner* — Edu E Enin-Okut
(74) *Attorney, Agent, or Firm* — Fitzpatrick, Cella, Harper & Scinto

(57) ABSTRACT

Provided is a method of manufacturing a membrane electrode assembly including catalyst layers in both sides of a polymer electrolyte membrane, substance diffusion of the catalyst layer being improved, in which forming at least one of the catalyst layers includes at least: forming a first layer including one of a catalyst and a catalyst precursor on a surface of a sheet by vapor-phase deposition; forming a through hole in the first layer; forming a second layer including one of a catalyst and a catalyst precursor on a surface of the first layer having the through hole by vapor-phase deposition; joining a polymer electrolyte membrane to a surface of the second layer; and peeling off the sheet from the first layer.

3 Claims, 27 Drawing Sheets

(56) References Cited

U.S. PATENT DOCUMENTS

| | | | |
|---|---|---|---|
| 8,574,789 B2 * | 11/2013 | Shelnutt et al. | 429/524 |
| 2002/0136940 A1 | 9/2002 | Mao et al. | |
| 2007/0099066 A1 | 5/2007 | Okumura et al. | |
| 2007/0134544 A1 | 6/2007 | Yamada et al. | |
| 2007/0212591 A1 | 9/2007 | Miyazaki et al. | |
| 2008/0166259 A1 | 7/2008 | Kijima et al. | |

FOREIGN PATENT DOCUMENTS

| | | | | |
|---|---|---|---|---|
| JP | 2004-327358 A | 11/2004 | | |
| JP | 2005-353541 A | 12/2005 | | |
| JP | 2005353541 A * | 12/2005 | | H01M 4/86 |
| JP | 2006-024556 A | 1/2006 | | |
| JP | 2006-049278 A | 2/2006 | | |
| JP | 2006-228450 A | 8/2006 | | |
| JP | 2006-278312 A | 10/2006 | | |
| JP | 2006-332041 A | 12/2006 | | |
| JP | 2007-123043 A | 5/2007 | | |
| JP | 2007-157645 A | 6/2007 | | |
| WO | 02/27850 A1 | 4/2002 | | |
| WO | 2006/1004023 A1 | 1/2006 | | |
| WO | WO 2006004023 A1 * | 1/2006 | | H01M 4/88 |

OTHER PUBLICATIONS

Madhu Sudan Saha et al.,"High Performance Polymer Electrolyte Fuel Cells with Ultra-Low Pt Loading Electrodes Prepared by Dual Ion-Beam Assisted Deposition," 51 Electrochim. Acta 4680-92 (Feb. 2006).

Office Action in Korean Application No. 10-2011-7030318 (Mar. 15, 2012).

Office Action in Korean Application No. 10-2010-7000040 (May 31, 2012).

* cited by examiner

30μm

60μm

MEMBRANE ELECTRODE ASSEMBLY AND FUEL CELL WITH DENDRITIC SHAPE CATALYST LAYER

TECHNICAL FIELD

The present invention relates to a method of manufacturing a membrane electrode assembly, a method of manufacturing a fuel cell, a membrane electrode assembly, and a fuel cell. The membrane electrode assembly manufactured by the manufacturing method of the present invention can be suitably used as a membrane electrode assembly of the fuel cell.

BACKGROUND ART

Polymer electrolyte fuel cells are expected as a future energy generating device because they have high energy conversion efficiency, are clean, and are quiet. Further, because the polymer electrolyte fuel cell has high energy density and the low operating temperature, in recent years, not only application to automobiles, household power generators, or the like, but also application to portable electrical apparatuses such as mobile phones, notebook personal computers, or digital cameras are taken in consideration. The polymer electrolyte fuel cell is capable of driving the portable apparatuses for a long time compared to a related-art secondary battery, thereby receiving attention.

Although the polymer electrolyte fuel cell has an advantage of being able to operate at an operating temperature of 100° C. or less, there is a problem in that, with a passage of power generation time, a voltage is gradually reduced, and the power generation stops at last.

Such a problem results from a so-called "flooding phenomenon" in which water generated by reaction remains in a void of a catalyst layer, and the water fills the void of the catalyst layer to block supply of a fuel gas serving as a reactive substance, thereby reducing a voltage to stop power generation reaction in the end. Flooding is apt to occur especially in a catalyst layer of a cathode side in which water is generated.

To use the polymer electrode fuel cell as a compact fuel cell for an electrical device for a practical purpose, the entire system has to be made compact. Especially, when a fuel cell is mounted on a compact electrical device, not only the entire system but also the cell itself have to be miniaturized. Accordingly, a method (air breathing) of supplying air through vent holes to a cathode by natural diffusion without using any pump or blower is considered promising.

When this method is used, because generated water is discharged out of the fuel cell only by natural evaporation, the generated water frequently remains in the catalyst layer to cause flooding.

Thus, improvement of gas diffusion of the catalyst layer, especially generated water scattering thereof, to suppress flooding is an important factor which determines performance stability of the fuel cell.

In this regard, Japanese Patent Application Laid-Open Nos. 2004-327358 and 2004-039474 disclose technologies involving improving gas diffusion and generated water scattering by disposing a water discharge groove in a catalyst layer.

International Publication No. WO 2006004023 discloses a method of forming a porous catalyst layer having a dendritic shape by using sputtering or ion plating. International Publication No. WO 2006004023 discloses a technology involving improving gas diffusion and generated water scattering by setting a thickness of the catalyst layer to several μm, which is smaller than that of a conventional platinum carrying carbon catalyst (several ten μm), and shortening a substance diffusion path of gas and water droplets.

According to M. S. Saha A. F. Gulla, R. J. Allen and S. Mukerjee, Electrochim. Acta, 51 (2006) 4680., when a catalyst layer is formed by ion beam assist deposition (IBAD), by using a mask, the catalyst layer is patterned to be divided into a catalyst forming area and a catalyst nonforming area. According to M. S. Saha A. F. Gulla, R. J. Allen and S. Mukerjee, Electrochim. Acta, 51 (2006) 4680., scattering of generated water and an output of the fuel cell are thus improved.

According to an example of International Publication No. WO 2006/004023, by using a transfer sheet made of polytetrafluoroethylene (PTFE) as a substrate, a porous catalyst layer is formed by vapor-phase deposition, and then transferred to a polymer electrolyte membrane to manufacture a membrane electrode assembly (hereinafter, referred to as "MEA").

However, the inventors of the present invention have zealously conducted a study to find that in the case of the embodiment of International Publication No. WO 2006/004023, a dense layer is formed with a thickness of about 0.1 to 0.2 μm near the PTFE sheet side of the porous catalyst layer. In this description of the present invention, the dense layer means a layered area which is porous but lower in porosity than other areas of the porous catalyst layer.

The inventors of the present invention have found a problem that when a fuel cell unit is assembled, the dense layer inhibits substance diffusion between the porous catalyst layer and a gas diffusion layer.

The inventors of the present invention have also found that when the MEA is manufactured, a swelling action of the electrolyte membrane generates many cracks of 1 μm or more in width in the catalyst layer at random. It is probable that in the porous catalyst layer, gas and water droplets are diffused in an in-plane direction of the catalyst layer, and transferred with the gas diffusion layer through the cracks.

In other words, conventionally, many places in which lengths of substance diffusion paths are larger than the thickness of the catalyst layer have been present, causing a reduction in substance diffusion of the porous catalyst layer.

Even if the manufacturing methods of Japanese Patent Application Laid-Open Nos. 2004-327358 and 2004-039474 are simply combined with the catalyst layer forming method of International Publication No. WO 2006/004023 to dispose a water discharge groove, a dense layer is still formed near the transfer sheet of the catalyst layer to inhibit substance diffusion, thus providing no solution to the problem.

According to the manufacturing method described in Japanese Patent Application Laid-Open No. 2004-039474, the transfer sheet is bent into a mold form by using a mold, thereby forming a nontransfer portion, that is, a groove of a catalyst. Thus, widths and intervals of grooves to be formed are larger twice or more than a thickness of the transfer sheet. According to Japanese Patent Application Laid-Open No. 2004-039474, no strength can be obtained to endure a manufacturing operation unless a thickness of the transfer sheet is 10 μm or more. Thus, this method has a problem in that widths and intervals of grooves have to be larger than 20 μm.

To improve substance diffusion of the catalyst layer described in International Publication No. WO 2006004023, an interval of the grooves has to be set almost equal to the thickness (several ten μm) of the catalyst layer. Thus, even if it is simply combined with the method described in Japanese Patent Application Laid-Open No. 2004-039474, this method provides no solution to the problem.

If a width of the groove is large, i.e., 100 μm, it is not suitable because a capillary force is reduced to cause easy remaining of generated water in the groove. Thus, the method provides no solution to the problem.

Formation of a catalyst nonforming area (this area is functionally a water discharge groove) by using mask deposition as described in M. S. Saha A. F. Gulla, R. J. Allen and S. Mukerjee, Electrochim. Acta, 51 (2006) 4680. is a simple method. However, a catalyst formed on the mask is useless, causing a cost problem. Even if the catalyst formed on the mask is recovered to be used again, recovery costs are considerable. Mask forming expenses also contribute to the cost increase.

The conventional technologies have had the above-mentioned problems. Thus, there has been a demand for a practical technology capable of improving substance diffusion and generated water scattering of the catalyst layer having the dendritic shape as described in International Publication No. WO 2006/004023, and catalyst use efficiency.

DISCLOSURE OF THE INVENTION

The present invention has been developed with the above-mentioned problems in mind, and it is an object of the present invention to provide a method of manufacturing a membrane electrode assembly in which substance diffusion and catalyst use efficiency are improved.

It is also an object of the present invention to provide, at low costs, a fuel cell having high-output and stable power generation characteristics by using the membrane electrode assembly manufactured by the manufacturing method.

It is yet another object of the present invention to provide a membrane electrode assembly excellent in substance diffusion and catalyst use efficiency, and a fuel cell which uses the membrane electrode assembly.

The present invention provides a method of manufacturing a membrane electrode assembly including a catalyst layer formed on both sides of a polymer electrolyte membrane, including at least:

forming a first layer including one of a catalyst and a catalyst precursor on a surface of a sheet by vapor-phase deposition;

forming a through hole in the first layer;

forming a second layer including one of a catalyst and a catalyst precursor on a surface of the first layer having the through hole by vapor-phase deposition;

joining a polymer electrolyte membrane to a surface of the second layer; and peeling off the sheet from the first layer.

With the use of the method including those steps, at least one of the catalyst layers is formed on the polymer electrolyte membrane.

In the method, the forming a through hole in the first layer preferably includes forming a through hole so that an opening ratio of a surface of the first layer in contact with the sheet is 8% or more to 40% or less.

In the method, the forming a through hole in the first layer preferably includes forming a through hole so that one of the catalyst and the catalyst precursor in the first layer remains by 50 μg or more per 1 cm$^2$ of a surface area of the sheet after the forming the through hole.

The method further includes, before the forming a first layer, forming an irregularity on the surface of the sheet, in which the first layer is formed on the surface of the irregularity. For such an irregularity, a streaky irregularity can be provided. For the step of forming an irregularity on the surface of the sheet, rubbing or polishing is suitably used. The step of joining the polymer electrolyte membrane to the surface of the second layer preferably includes a step of joining together a second layer formed on a protruded portion of the irregularity, at least a part of a second layer formed on a recessed portion, and the polymer electrolyte membrane.

Various methods for forming the through holes are available. A dry etching method is preferably used.

The method of manufacturing a membrane electrode assembly preferably includes reducing PtOx (x≥2), in which the first layer includes one of platinum and a platinum oxide, and the second layer includes the PtOx (x≥2). By the reducing PtOx (x≥2), a catalyst layer of a dendritic shape is preferably formed.

Further, the present invention provides a method of manufacturing a fuel cell, including at least: manufacturing a membrane electrode assembly by the method of manufacturing a membrane electrode assembly according to any one of the methods described above; and forming gas diffusion layers on both sides of the membrane electrode assembly.

Further, the present invention provides a membrane electrode assembly including:

catalyst layers formed on both sides of a polymer electrolyte membrane, at least one of which has a dendritic shape, in which each of the catalyst layers having the dendritic shape includes a macrocrack and a through hole, and an opening ratio of the through hole in an area surrounded with the macrocrack of the catalyst layer having the dendritic shape in a surface opposed to the polymer electrolyte membrane is 8% or more to 40% or less.

A weighted average of a diameter of an area surrounded with the macrocrack corresponding to a circle is preferably 35 μm or less, and a standard deviation of the diameter corresponding to the circle is preferably 50% or less of the weighted average.

Further, the present invention provides a fuel cell including at least: the membrane electrode assembly as described above; and gas diffusion layers present on both sides of the membrane electrode assembly.

BEST MODE FOR CARRYING OUT THE INVENTION

Figure 1:
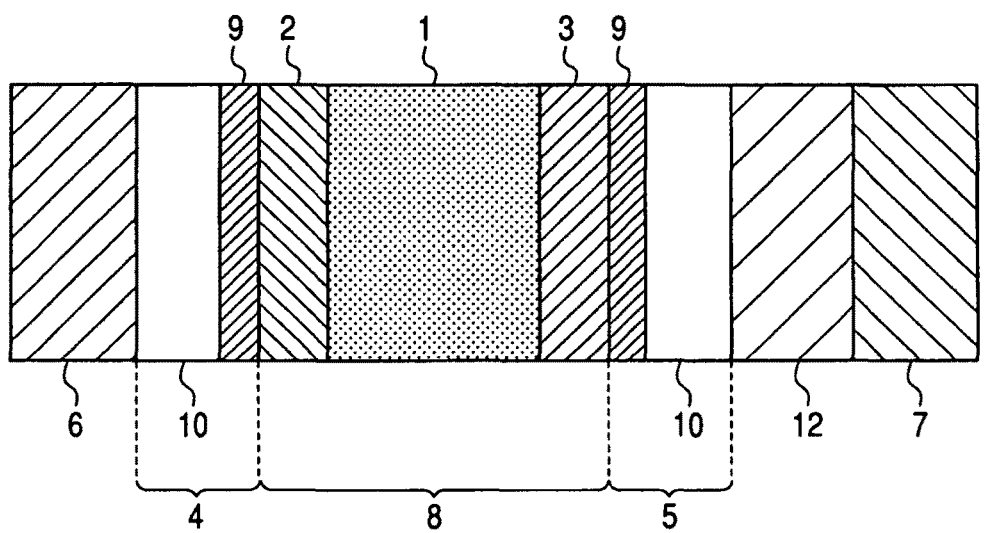
FIG. 1 is a schematic diagram illustrating an example of a single unit sectional configuration of a polymer electrolyte fuel cell.

The inventors of the present invention have conducted a keen study, and reached a conclusion that an effective solution to the above-mentioned problems is improvement of substance diffusion of the dense layer and/or shortening of a substance diffusion path length of an in-plane direction of a catalyst layer by reducing a diameter of a catalyst area (hereinafter, also referred to as "catalyst grain") of an island shape surrounded with the cracks corresponding to a circle.

In addition, the inventors of the present invention have found that the substance diffusion of the catalyst layer can be improved by reducing the variance of the diameter of the catalyst grain corresponding to the circle.

Referring to the drawings, embodiments of a method of manufacturing a membrane electrode assembly, a method of manufacturing a fuel cell, a membrane electrode assembly, and a fuel cell according to the present invention are described below. Note that, however, a scope of the present invention is defined by a scope of claims, and a description below is in no way limitative of the scope of the invention. For example, a material, size, shape, arrangement, and manufacturing conditions described below do not limit the scope of the invention.

The embodiments of the membrane electrode assembly and the fuel cell manufactured by the manufacturing methods of the present invention will be described first.

The membrane electrode assembly (MEA) described herein includes catalyst layers formed on both sides of a polymer electrolyte membrane.

FIG. 1 is a schematic view illustrating an example of a sectional constitution of a fuel cell unit using the membrane electrode assembly manufactured by the method of the present invention. FIG. 1 illustrates a solid polymeric electrolyte membrane 1 and a pair of catalyst layers, that is, an anode side catalyst layer 2 and a cathode side catalyst layer 3 arranged so that a polymer electrolyte membrane 1 is sandwiched therebetween. An integrated article of the polymer electrolyte membrane 1, the anode side catalyst layer 2, and the cathode side catalyst layer 3 is an MEA 8.

In this embodiment, a case in which the catalyst layer by the manufacturing method of the present invention is arranged only on a cathode (air electrode) side electrode is shown. However, the arrangement and constitution of the catalyst layer are not limited to this case. For example, the catalyst layer of the present invention may be arranged on each of both electrodes, or may be arranged only on an anode side. In view of the fact that flooding is apt to occur in a cathode side catalyst layer where water is produced, the catalyst layer by the manufacturing method of the present invention can be arranged at least on the cathode side.

An anode side gas diffusion layer 4 and an anode side electrode (fuel electrode) 6 are arranged outside the anode side catalyst layer 2. The anode side electrode 6 has at least one through hole through which a fuel gas (hydrogen gas representatively) can pass. The anode side gas diffusion layer 4 includes a microporous layer (hereinafter, abbreviated as "MPL") 9, and a gas diffusion substrate 10 for supporting the MPL 9.

A cathode side gas diffusion layer 5, a cathode side electrode (air electrode) 7, and a foamed metal 12 are arranged outside the cathode side catalyst layer 3. The cathode side gas diffusion layer 5 also includes an MPL 9, and a gas diffusion substrate 10 for supporting the MPL 9.

Further, as a material for the electrodes 6 and 7, there is suitably used a material having excellent conductivity and acid resistance. Specific examples of the suitable materials can include platinum, titanium, carbon, stainless steel (SUS), SUS coated with gold, SUS coated with carbon, aluminum coated with gold, and aluminum coated with carbon.

As a material for the foamed metal 12, as in the case of the electrodes 6 and 7, a material having excellent conductivity and oxidation resistance can be used. Specifically, SUS, a nickel chrome alloy, or titanium can be used. As an example of a nickel chrome alloy foamed metal, there is Celmet (registered trademark, manufactured by Sumitomo Electric Toyama Co., Ltd.). From the standpoint of improving corrosion resistance and reducing contact resistance, a material obtained by coating one of those materials with gold may be used. The foamed metal 12 does not have to be always used. When the foamed metal 12 is not used, a through hole has to be formed in the electrode 7 to add a function to permit passage of at least oxygen and a steam gas. Installation of the foamed metal 12 is not limited to the cathode side. The foamed metal 12 may be used only for the anode side or for both electrodes. There is no particular limitation on a porous diameter or a porosity of the foamed metal 12 as long as diffusion of a reactive gas or steam is not inhibited.

For the polymer electrolyte membrane (may be also simply referred to as "electrolyte membrane") 1, a perfluorocarbon polymer containing a sulfonic acid group can be used. An example of a perfluorosulfonic acid polymer is Nafion (registered trademark, manufactured by Dupont Kabushiki Kaisha).

When moving toward the cathode side in the electrolyte membrane, protons $H^+$ frequently move through a hydrophilic portion of the electrolyte membrane by using water molecules as media. Accordingly, the electrolyte membrane can have a function of holding water molecules.

The polymer electrolyte membrane can have a function of transmitting protons H+ generated on the anode side to the cathode side but not an unreacted reactive gas (hydrogen or oxygen), and a predetermined water retention. For the polymer electrolyte membrane, an optional material can be selected to be used from materials having such functions by taking various conditions into consideration.

The gas diffusion layers 4 and 5 can have the following functions. First is, in order that electrode reaction be performed efficiently, a function of uniformly supplying a sufficient amount of fuel gas or air in plane to an electrode reaction area of the catalyst layer of the fuel electrode or the air electrode. Second is a function of discharging charges generated by electrode reaction to the outside of a single unit. Third is a function of efficiently discharging reaction generated water or an unreacted gas to the outside of the single unit.

For a gas diffusion layer having such a function, an electron-conductive porous substance can be used. For example, carbon cloth or carbon paper can be used for the gas diffusion substrate 10, and a carbon particle layer using PTFE as a binder can be suitably used for the MPL 9. For carbon particles, acetylene black, ketchen black, vapor grown carbon fiber, or a carbon nanotube can be used. The cathode side catalyst layer 3 can be a porous catalyst layer which includes a set of platinum nanoparticles. Of those, a catalyst layer of a dendritic shape obtained by reducing $PtOx$ ($x \geq 2$: typically, platinum dioxide) partially can be used for the cathode side catalyst layer 3. The catalyst layer of the dendritic shape is an excellent porous catalyst layer having a large specific surface area.

The dendritic shape described herein, represents a structure in which many barlike or flakelike (thin pieces) organizations including collections of catalyst nanoparticles are collected with branch points. Observation of a section of the catalyst layer having a dendritic shape under a tunnel microscope indicates a shape, such as a tree branched by collecting a plurality of barlike or flakelike structures containing catalyst particles.

One barlike or flakelike organization can have a short direction length of 5 nm or more to 200 nm or less. The short direction length in this case means a minimum size of one barlike or flakelike structure in a virtual projection plane. As for a set of platinum nanoparticles of the dendritic shape, for example, a technology disclosed in Japanese Patent Application Laid-Open No. 2006-49278 can be applied to the present invention.

In this specification, when simply referred to as a platinum dioxide, it means $PtOx$ ($X \geq 2$). In other words, there are contained not only a general platinum oxide represented by a chemical formula of $PtO_2$ but also one represented by a chemical formula $PtOx$ ($X>2$). Even when the material represented by the chemical formula $PtOx$ ($X>2$) is used, satisfactory effects of the present invention can be obtained. There is no particular limitation on X. Considering a nature of platinum, however, an upper limit of X may realistically be 2.5. From the standpoint of obtaining a catalyst layer of a dendritic shape, the platinum dioxide thus defined can be reduced. To obtain a dendritic structure, a crystal platinum dioxide or an amorphous platinum dioxide containing hexagonal can be reduced. For the first layer, however, a platinum oxide other than the platinum dioxide can be used. This is because while an influence of a composition of the first layer on formation of a dendritic shape is extremely small, a through hole can be made of materials other than the platinum dioxide.

The platinum nanoparticles having diameters of 2 nm or more to 20 nm or less can be used because of their high catalyst activity. The platinum nanoparticles having diameters of 2 nm or more to 10 nm or less can particularly be used because of large surface areas.

If a diameter exceeds 20 nm, catalyst activity may be reduced, causing a reduction in performance of a fuel cell. On the other hand, if a diameter is less than 2 nm, manufacturing is difficult.

The cathode side catalyst layer 3 can contain hydrophobic agents.

To add hydrophobic agents to the cathode side catalyst layer 3, there can be used a well-known method such as a method of adding a fluorocarbon resin particle dispersion liquid (e.g., Polyflon (registered trademark, manufactured by Daikin Industries, Ltd.) or a method described in Japanese Patent Application Laid-Open No. 2006-332041). From the standpoint of adding the hydrophobic agents to the entire of holes of the catalyst layer 3, the method described in Japanese Patent Application Laid-Open No. 2006-332041 can particularly be used.

The method described in Japanese Patent Application Laid-Open No. 2006-332041 specifically has the following steps. First, hydrolysis reaction is caused by a catalyst action of a platinum oxide to bring an Si compound containing hydrophobic substituents which generates a polymerizable group into contact with the platinum oxide. Then, the Si compound is subjected to polymerization reaction, to thereby generate hydrophobic agents in a surface of the platinum oxide. Subsequently, the platinum oxide is reduced.

According to this method, hydrophobic agents including methylsiloxane can easily be added only to the cathode side catalyst layer 3.

The above-mentioned technologies regarding the cathode side catalyst layer 3 can all be applied to the anode side catalyst layer 2. However, in consideration of the fact that flooding is difficult to occur in the anode side catalyst layer 2 while flooding easily occurs in the cathode side catalyst layer 3, for the anode side catalyst layer 2, a general catalyst such as platinum black and platinum-carrying carbons can be used.

Next, an embodiment of a manufacturing method of the present invention will be described.

A first embodiment of the present invention relates to a method of manufacturing a membrane electrode assembly, which includes: forming a catalyst layer or a catalyst precursor layer (first layer) on a surface of a sheet (hereinafter, referred to as "transfer sheet" for easy understanding) by vapor-phase deposition; forming a through hole in the catalyst layer or the catalyst precursor layer; and further forming a catalyst layer or a catalyst precursor layer (second layer) on a surface of the catalyst layer or the catalyst precursor layer in which the through hole has been formed.

For the vapor-phase deposition, a spattering method such as reactive spurring or an ion plating method can be used.

For the transfer sheet used in the present invention, a material having a heat-resistant temperature of 130° C. or more can be used. This is because, in transferring to form an MEA, hot pressing is carried out at a temperature equal to or more than a glass transition temperature (130° C. in the case of Nafion (registered trademark)) of a polymer electrolyte membrane. If a material having a high heat-resistant temperature is used, when a temperature of the transfer sheet increases during vapor-phase deposition, a fear of damaging the transfer sheet can be reduced. More specifically, for the transfer sheet, a resin substrate having a high heat-resistant temperature such as PTFE, polycarbonate, and polyimide can be used.

In the case where center line average roughness of the transfer sheet is 10 nm or less, when a platinum dioxide layer is formed by vapor-phase deposition such as ion plating and reactive sputtering, a dense layer is normally formed with a thickness of 0.02 to 0.2 µm near the sheet, and a porous layer is formed thereon. Those layers form a catalyst precursor layer as a whole. The thickness of the dense layer changes depending on total atmospheric pressure during film formation: smaller as the total pressure is higher, and larger as the total pressure is lower. For example, dense layers of 0.02 µm, 0.1 µm, and 0.2 µm are formed at total pressures of 8 Pa, 5 Pa, and 3 Pa, respectively.

When the catalyst precursor layer is reduced after transfer to an electrolyte membrane, or a catalyst layer obtained by reducing the catalyst precursor layer is transferred to the electrolyte membrane to form an MEA, a dense layer (not shown) of the catalyst layer is exposed to a catalyst layer surface of an MPL 9 side. As a result, in a fuel cell single unit, the dense layer is positioned between a porous layer (not shown) of the catalyst layer and the MPL 9, inhibiting substance diffusion between the catalyst layer and a gas diffusion layer.

In the case where center line average roughness of the transfer sheet is 10 nm or more, no dense layer is formed. If roughness is large, even when a PTFE sheet is excellent in releasing force is used, peeling-off the transfer sheet from the catalyst layer after transfer is difficult.

Figure 4:
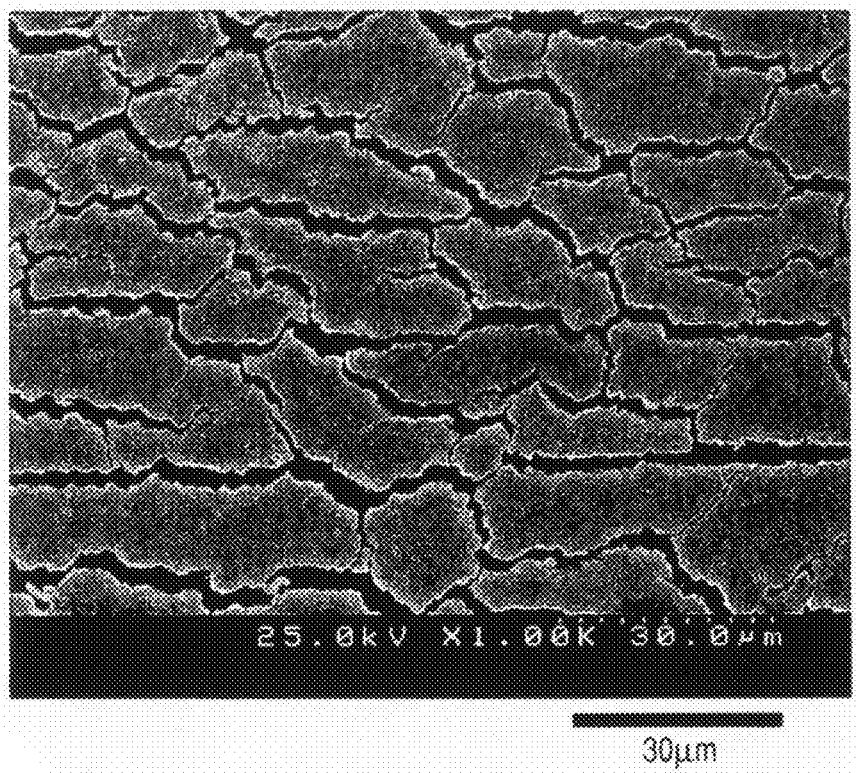
FIG. 4 illustrates a scanning electron micrograph (magnification of ×1,000) of a catalyst layer surface according to Comparative Example 1.
Figure 5:
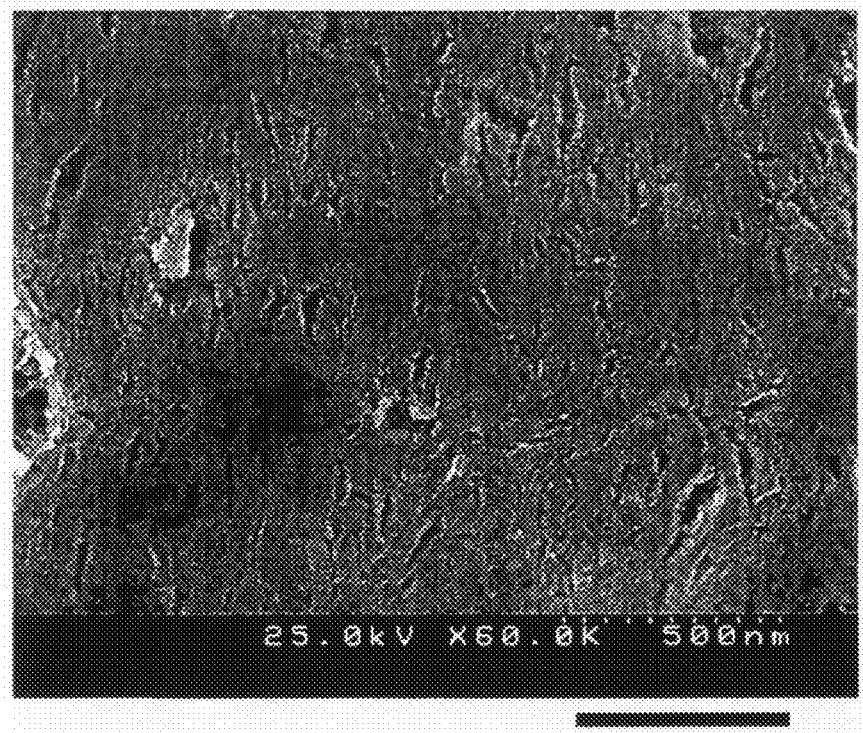
FIG. 5 illustrates a scanning electron micrograph (magnification of ×60,000) of the catalyst layer surface according to Comparative Example 1.

Each of FIGS. 4 and 5 illustrates a surface (MPL side) of a catalyst layer formed by a conventional manufacturing method. It can be understood from FIG. 5 that the catalyst layer surface is considerably dense while including microcracks.

As illustrated in FIG. 4, numerous cracks of several µm in width are present in a mesh shape in the conventional catalyst layer surface. It is probable that those cracks may have been formed with swelling of the electrolyte membrane.

In the case of the conventional catalyst layer, a gas or water droplets mainly move through those large cracks. Since an interval between the large cracks is large, when a reactive gas or generated water moves in a thickness direction of the catalyst layer, a moving distance of the reactive gas or the generated water through the catalyst layer in an in-plane direction becomes longer. Thus, the conventional catalyst layer may have low substance diffusion in the thickness direction.

On the other hand, according to the first embodiment of the present invention, the through hole is formed in the dense layer. Since the through hole is present in the dense layer, a moving distance in an in-plane direction is short when a reactive gas or generated water moves in a thickness direction of the catalyst layer. Thus, substance diffusion coefficient in the thickness direction of the catalyst layer is considerably improved compared with the conventional catalyst layer.

An opening ratio of the through hole formed on the surface of the first layer, which is in contact with the transfer sheet, can be 8% or more to 40% or less. If an opening ratio is less than 8%, effects of the present invention are greatly reduced. If an opening ratio exceeds 40%, effects of the present invention are almost saturated, and an adhesive force between the transfer sheet and the first layer is reduced, which leads to easy peeling. Thus, handling during manufacturing is difficult.

A shape of the through hole of the present invention does not have to be near-circular in section. For example, macrocracks formed by a plurality of rows of through holes near-circular in section are included in the through hole of the present invention. The microcracks herein mean cracks having a width of 1 µm or less. According to the invention, cracks having a width exceeding 1 µm are called macrocracks herein. A representative example of the macrocrack is a streaky crack. According to the invention, "streaky cracks" herein mean those in which cracks having a width of 1 µm or more are roughly linear over a length of at least 100 µm or more.

According to the present invention, an opening ratio of the through hole is an occupation ratio of an opening portion of the through hole of one catalyst grain on the layer surface. One catalyst grain is an area surrounded with macrocracks. When the through hole is formed in the first layer, almost no such macrocracks are present. Thus, for calculation of an opening ratio, an area occupied by an opening portion of the macrocrack can be ignored. Definition of the opening portion is practically significant only when a membrane electrode assembly or a fuel cell is formed in the end. Calculation of an opening ratio of the through hole for such a case will be described.

First, a primary plane (surface opposed to the polymer electrolyte membrane: in other words, appearing surface) of a catalyst layer after formation of a membrane electrode assembly (catalyst layer obtained by reduction when a layer to be a catalyst precursor is used in a manufacturing process) is shot by a scanning electron microscope. During shooting, a shooting position and a magnification are properly adjusted to prevent entry of macrocracks (in other words, cracks other than a through hole (including microcracks)) to a screen. During the shooting, because an opening portion is shot dark while others (portions of the surface in which the catalyst is present) are shot bright, image quality can be adjusted to set contrast as high as possible.

Next, by using image analysis software (e.g., product name "A-zo kun" manufactured by Asahi Kasei Engineering Corporation), image black and white binarization and image analysis are carried out for an obtained electron micrograph. Accordingly, an occupation ratio (opening ratio of the through hole according to the present invention) of an opening portion of a through hole of each catalyst grain can be calculated.

A thickness of the catalyst layer or the catalyst precursor layer formed in the surface of the transfer sheet by the vapor-phase deposition can be 50 to 500 nm. If a thickness is less than 50 nm, formation of a through hole to prevent excessive reduction of the catalyst layer or the catalyst precursor layer left after the next through hole formation is difficult. On the other hand, if a thickness exceeds 500 nm, the amount of platinum dioxide to be removed in the through hole formation is excessively large, increasing platinum wastes.

In the through hole formation, an etching method can be used, and in particular, a dry etching method.

In the through hole formation, conditions (e.g., etching condition) to set an opening ratio of a through hole to 8% or more to 40% or less can be properly selected. After formation of the through hole, the catalyst layer or the catalyst precursor layer can be left by 50 μg/cm² or more per transfer sheet area.

If a remaining amount is less than 50 μg/cm², an area of the catalyst layer or the catalyst precursor layer covering the substrate is too small, and thus an exposed area of the substrate is enlarged. Accordingly, in next deposition, a dense layer may be formed again, resulting in unsatisfactory acquisition of effects of the present invention.

Through hole formation conditions (e.g., etching condition) can be properly selected to leave the catalyst or the catalyst precursor of the first layer with 50 μg/cm² per surface area 1 cm² of the sheet after the through hole formation.

A porosity of the first layer after the through hole formation can be set to 35% or more to 45% or more.

The porosity is set to 35% or more, whereby substance diffusion and generated water scattering can be further improved. On the other hand, the porosity can be set to over 45%. However, even if the porosity is increased within a range of over 45%, improvements of substance diffusion and generated water scattering are reduced, and an adhesive force between the transfer sheet and the first layer is reduced to cause easy peeling. Thus, more careful handing is required during manufacturing.

The porosity is calculated as follows. First, the MEA is cut by using a focused ion beam (FIB) (hereinafter, referred to as "FIB processing"), and its section is observed and shot by a scanning electrode microscope (SEM). In a first layer of the obtained section picture, a line parallel to a primary plane of the first layer is drawn. Since a hole portion is observed black, and a catalyst portion is observed white in the SEM picture, an occupation ratio of a black pixel located in all pixels on the line is set as a porosity of the first layer.

During the FIB processing, rather than entering FIB at an angle of 90° with respect to the primary plane of the catalyst layer to cut the layer, an incident angle of FIB is set to 20 to 40° with respect to the primary plane of the catalyst layer, whereby the layer is cut at an angle not perpendicular to the primary plane. As a result, a slope of the catalyst layer is exposed. Through this cutting, plane information is added to section information to enable acquisition of an image including three-dimensional information. Thus, a more accurate porosity can be obtained.

If the catalyst layer is dipped in ink and the holes of the catalyst layer are filled with carbons before the FIB processing, sticking of scattered articles during the FIB processing can be prevented, and a contrast ratio between the holes and the catalyst can be increased during SEM observation. Thus, an accurate porosity can be calculated. This method facilitates spreading of the ink through the first layer. However, it is difficult to spread the ink to all the areas of the catalyst layer. Thus, in section observation of a sample manufactured by this method, an image of high contrast can be obtained for a first layer, while only an inaccurate image can be obtained for a second layer. For an observed image obtained by this method, only an area of the first layer can be set as an analysis target.

An example of a method of manufacturing a fuel cell (single unit) according to the first embodiment of the present invention will be described below in more detail step by step.

Reduction processing (3) described below may be carried out after processing (5).

(1) A platinum dioxide layer is formed (catalyst precursor layer).

First, a platinum dioxide layer is formed on a surface of a polytetrafluoroethylene (PTFE) sheet serving as a transfer sheet by reactive sputtering.

Then, dry etching is carried out under an Ar atmosphere for through hole formation.

Secondly, a platinum dioxide layer is formed on a surface of the platinum dioxide layer subjected to the dry etching by reactive sputtering.

(2) A catalyst layer is subjected to hydrophobic processing.

Subsequently, the catalyst layer is made hydrophobic by the well-known technology described in Japanese Patent Application Laid-Open No. 2006-332041. In other words, the obtained porous platinum oxide layer is brought into contact with a gas of an Si compound containing hydrophobic substituents to generate hydrophobic agents on a surface of the catalyst. Then, polymerization reaction of the hydrophobic agents may be promoted through heating.

(3) A platinum dioxide layer is subjected to reduction processing.

Subsequently, the platinum dioxide layer is subjected to hydrogen reduction processing to obtain a porous platinum catalyst layer serving as a cathode side catalyst layer.

After that, the proper amount of a Nafion isopropyl alcohol solution which is proton conductive electrolytic is dropped on the obtained catalyst layer. Then, a solvent is evaporated in vacuum to form a proton gas on a surface of the catalyst.

Thus, a cathode side catalyst layer is obtained.

(4) An anode side catalyst layer is prepared.

On a surface of a PTFE sheet, a platinum-carrying carbon catalyst layer is formed by using a doctor blade, thereby obtaining an anode side catalyst layer. A thickness of the catalyst layer can be in a range of 20 to 40 μm. A catalyst slurry used in this case is a kneaded product of platinum-carrying carbon (manufactured by Johnson Matthey, HiSPEC 4000), Nafion, PTFE, IPA, and water.

(5) An MEA is prepared.

The polymer electrolyte membrane (manufactured by DuPont Kabushiki Kaisha, NRE211) is sandwiched between the PTFE sheet with the cathode side catalyst layer obtained by the process (3) and the PTFE sheet with the anode side catalyst layer obtained by the process (4) so that each catalyst layer is made to face inside, followed by hot press. After that, the outside PTFE sheet of the cathode side catalyst layer and the outside PTFE sheet of the anode side catalyst layer are removed to obtain an MEA provided with the catalyst layer of the present invention.

(6) A fuel cell unit is manufactured.

The MEA obtained in the process (5) is sandwiched as illustrated in FIG. 1 by the gas diffusion layers 4 and 5 each formed of a carbon cloth (manufactured by E-TEK, INC., LT1400-W), the anode side electrode 6, the foamed metal 12, and the cathode side electrode 7, thereby manufacturing a fuel cell unit.

A fuel cell in which a plurality of single units thus manufactured are stacked can be manufactured.

A second embodiment of the present invention is characterized by addition of formation of an irregularity in the transfer sheet before the first film formation. In this way, in the formed MEA, macrocracks (e.g., streaky cracks) are formed in the catalyst layer in addition to the through hole.

Thus, substance diffusion can be further improved. The second embodiment is described below in more detail.

Formation of an irregularity on the surface of the transfer sheet is accompanied by formation of a similar irregular portion in the catalyst layer or the catalyst precursor layer. If a height difference of irregularity of the catalyst layer or the catalyst precursor layer and a space interval (minimum distance in recessed portion between steps: i.e., a minimum width of recessed portion) are controlled, when the catalyst layer (may be a catalyst layer obtained by reducing the catalyst precursor layer) or the catalyst precursor layer is transferred to the electrolyte membrane, the electrolyte membrane can be brought into contact with the recessed portion. As a result, a catalyst layer of the recessed portion can be transferred together with the catalyst layer of the protruded portion to the electrolyte membrane. Accordingly, during transfer (hot pressing), the catalyst layer or the catalyst precursor layer is sheared and damaged in the step portion of the irregularities. Thus, cracks having shapes which reflect the irregularity shape (step) are formed in a dense layer of the catalyst layer or the catalyst precursor layer. After the hot pressing, widths of the cracks are enlarged with swelling of the electrolyte membrane to form numerous macrocracks exceeding 1 µm in width. An example of control will be described later.

The macrocracks thus formed function also as water discharge grooves in the catalyst layer in the end. In other words, as compared with a mask deposition method, a membrane electrode assembly and a fuel cell can be manufactured at low cost without wasting any catalysts.

According to the second embodiment, a through hole also has to be formed in the dense layer. This is because if no through hole is formed in the dense layer, no shearing or damage can be generated because a mechanical strength of the dense layer is high, nor any macrocracks reflecting the irregularity shape are formed.

According to a specific method of the second embodiment, the process (1) to (6) of the first embodiment is carried out after the process (A). According to the second embodiment, the process (3) may also be carried out after the process (5).

(A) Irregularities are formed in the transfer sheet.

Irregularities are formed on a surface of a PTFE sheet serving as a transfer sheet by using polishing, rubbing, or imprinting.

There is no particular limitation on a method of forming irregularities. For example, there can be used imprinting, polishing by sandpaper, rubbing using rubbing cloth, various pressing operations, molding by melting a sheet to form an irregular surface, formation of a recessed portion by executing laser irradiation to thermal or photo-decomposing molecules of a sheet surface, or partially melting a portion near the sheet surface, or a photolithography process. From the standpoint of manufacturing costs, rubbing or polishing can be used. When rubbing or polishing is used, irregularities of various shapes can be formed in the transfer sheet. In this case, a shape of an irregularity formed in the transfer sheet can have center line average roughness (Ra) of 0.38 µm or more to 30 µm or less. Setting of Ra to 0.38 µm or more facilitates formation of macrocracks reflecting the irregularity shape in the catalyst layer in the end. Setting of Ra to 30 µm or less improves contact between a catalyst layer of the recessed portion and the electrolyte membrane during transfer to the electrolyte membrane, thereby suppressing wastes of a catalyst or a catalyst precursor.

The irregularity shape can be precisely controlled by using an imprinting method or a photolithography process. In this case, a height difference between the recessed and protruded portions can be set to 0.1 µm or more. Setting of the height difference between the recessed and protruded portions to 0.1 µm or more provides a sufficient height difference to the dense layer as compared with a thickness (0.02 µm to 0.2 µm) of the dense layer, thereby facilitating shearing destruction during transfer.

Irrespective of a method of forming irregularity, a height difference between the recessed and protruded portions can be set equal to or less than a sum of an entry depth of the electrolyte membrane to the recessed portion during transfer and a thickness of the catalyst layer or the catalyst precursor layer. This relation improves transfer of the catalyst layer or the catalyst precursor layer of the recessed portion.

The entry depth of the electrolyte membrane to the recessed portion depends on a temperature of the transfer. In other words, during transfer, heating of the electrolyte membrane to a softening point or more facilitates entry of the electrolyte membrane to the recessed portion. Because the entry depth depends on physical properties of the electrolyte membrane, it is advisable to predesign a height difference between the recessed and protruded portions of the transfer sheet surface according to the electrolyte membrane to be used. For example, when NRE 212 (manufactured by Dupont Kabushiki Kaisha, thickness of 50 µm) is used for the electrolyte membrane, and a thickness of the catalyst layer is 2 µm, a height difference between the recessed and protruded portions of the transfer sheet surface can be set to 20 µm or less.

The space interval can be set to 5 µm or more to 200 µm or less. Setting of the space interval to 5 µm or more facilitates entry of the electrolyte membrane to the recessed portion during transfer. Setting of the space interval to 200 µm or less increases the number of macrocracks reflecting the irregularity shape. For the space interval, because an optimal range varies depending on physical properties of the electrolyte membrane, it is advisable to predesign a space interval according to an electrolyte membrane to be used. For example, when NRE 212 (manufactured by Dupont Kabushiki Kaisha, thickness of 50 µm) is used for the electrolyte membrane, and a thickness of a catalyst layer is set to 2 µm, space intervals of the transfer sheet according to a height difference between the recessed and protruded portions of the transfer sheet can be set as follows.

Height difference between recessed and protruded portions≤2 µm: 5 µm<space interval≤50 µm Height difference between recessed and protruded portions>2 µm: 10 µm<space interval≤50 µm For the shape of the irregularity provided on the transfer sheet, a streaky shape (straight, curved or zigzag), a dot shape, a hole shape, or a mixed shape of those can be used. Even when any shape of the irregularity is employed, the catalyst layer or the catalyst precursor layer of the recessed portion is transferred to the electrolyte membrane during transfer. Accordingly, macrocracks reflecting the employed shape of the irregularity are formed in the catalyst layer in the end.

Many cracks are present in a catalyst layer formed without disposing any recessed or protruded portions in the transfer sheet. For example, when a platinum oxide layer as a catalyst precursor layer is reduced to obtain a catalyst layer, cracks (hereinafter, referred to as cracks A) caused by volume reduction following the reduction, and cracks (hereinafter, referred to as cracks B) generated with swelling of the electrolyte membrane are present.

Catalyst grains can be reduced more by forming, in addition to those cracks, cracks (hereinafter, referred to as cracks C) reflecting the shape of the irregularity through the process of the second embodiment. Accordingly, substance diffusion in the catalyst layer can be improved more. This is because a reactive gas or generated water present in the catalyst layer can be diffused not only through the dense layer (mainly the through hole thereof) of the catalyst layer but also through the cracks C in an in-plane direction, and a substance diffusion distance in the in-plane direction of the catalyst layer becomes shorter as the catalyst grains becomes smaller.

In this case, a weighted average D of a diameter of an area (catalyst grain) surrounded with the macrocracks of the catalyst layer corresponding to a circle can be 35 μm or less.

By setting the weighted average D to 35 μm or less, substance diffusion in the catalyst layer can be improved more.

The weigh average D can be obtained by the following expression:

$$\sum_{n=1}^{N} [S(n) \cdot S(n)^3] \bigg/ \sum_{n=1}^{N} [S(n)^3]/\pi \qquad \text{Expression (1)}$$

(In Expression (1), N is a total number of catalyst grains, and S(n) is a circumferential length of an n-th catalyst grain).

S(n) is obtained as follows.

First, a primary plane (surface of a side opposed to a polymer electrolyte membrane: surface which has appeared) of a catalyst layer obtained after a membrane electrode assembly is formed (catalyst layer after reduction when a catalyst precursor layer is reduced) is shot by a scanning electron microscope. A shooting area can be 0.08 mm$^2$ or more. To grasp a correct shape by shooting a crack or a catalyst grain with high resolution, a plurality of places of the catalyst layer can be shot by a magnification of ×500 or more to set a sum total of shooting areas to 0.08 mm$^2$ or more. In this case, particle analysis can be carried out for each image.

During shooting, opening portions of the crack and the through hole are shot dark, while other catalyst grain portions are shot bright. Accordingly, image quality can be adjusted to obtain contrast as high as possible.

Next, by using image analysis software (e.g., product name "A-zo kun" manufactured by Asahi Kasei Engineering Corporation), the obtained electron micrograph is subjected to image white and black binarization and image analysis, thereby obtaining a circumferential length S(n) of each catalyst grain. Grains present in image ends but not showing the entire catalyst grains have to be removed from an analysis target.

For analysis, various parameters are set so that catalyst grains can be accurately extracted as particles from the obtained image.

When recessed and protruded portions are formed in the transfer sheet by rubbing or polishing, one large catalyst grain in which cracks stop in the middle of catalyst grains and a plurality of catalyst grains are partially connected may be observed. For such a large catalyst grain, if a minimum width of a connected portion is 5 μm or less, considering that the catalyst grain has practically been cut, particle analysis is carried out with the catalyst grain set as another catalyst grain. This is because when a macrocrack function of improving substance diffusion is taken into consideration, if the connected portion has a sufficiently small width while cracks do not completely divide the grain, in its surrounding catalyst layer, effects substantially similar to those obtained when the cracks completely divide the grain can be obtained.

The circumferential length can be measured simultaneously with measurement to obtain the opening ratio of the through hole.

Substance diffusion becomes higher as a weighted average D of a diameter of an area (catalyst grain) surrounded with the macrocracks of the catalyst layer corresponding to a circle becomes smaller.

When rubbing or polishing is used, however, recessed and protruded portions of various shapes are formed, and thus there is a limit to reduction of a D value. Experiment and a study conducted by the inventors of the present invention show that a lower limit D value is 16 μm.

On the other hand, when an imprinting method or a photolithography method is used, a shape of the irregularity can be precisely controlled with dimension accuracy of 1 μm or less. Thus, a D value can be reduced more, leaving costs out of consideration. Also in this case, a D value can be set to 5 μm or more. This is because setting of a space interval of the transfer sheet and a minimum width of the protruded portion to 5 μm or more is suitable for transfer to a catalyst or a catalyst precursor of the recessed portion.

When a space interval of the transfer sheet and a minimum width of the protruded portion are set to 5 μm or more to 50 μm or less, an interval between cracks C is 5 μm or more to 50 μm or less. In this case, stress relaxation of the catalyst layer occurs, making generation of other cracks (cracks A and B) difficult. In other words, effects of reducing a D value by cracks A or B are difficult to be obtained. Thus, even when a space interval of the transfer sheet and a minimum width of the protruded portion are set to 5 μm, it is difficult to set a D value to less than 5 μm.

When standard deviation of the diameter of the area (catalyst grain) surrounded with the macrocracks of the catalyst layer corresponding to the circle is σ, σ/D can be set to 50% (0.5) or less from the standpoint of improving substance diffusion, and more preferably to 40% (0.4) or less. There is no lower limit to a value of σ/D. However, when rubbing or polishing was used, an experimentally confirmed lower limit value of σ/D was 37% (0.37). If costs are left out of consideration, σ/D can be set to 3% or less by using an imprinting method or a photolithography method.

Various methods can be employed for manufacturing the MEA and the fuel cell according to the embodiment of the present invention.

The present invention is described below in detail by way of specific examples.

Example 1

Example 1 is directed to a polymer electrolyte fuel cell of a configuration illustrated in FIG. 1 and manufactured by using the first embodiment of the present invention.

A manufacturing process of the polymer electrolyte fuel cell of Example 1 will be described below in detail.

(Step 1)

First, in first deposition, a platinum oxide layer was formed with a thickness of 300 nm on a surface of a PTFE sheet (Nitoflon manufactured by Nitto Denko Corporation: may be referred to as "substrate" hereinafter) by RF reactive sputtering. For a reactive sputtering device, CS-200 manufactured by ULVAC Inc., was used. Here, the reactive sputtering was performed under the conditions of: a total pressure of 5 Pa; an oxygen flow rate ratio ($Q_{O2}/(Q_{Ar}+Q_{O2})$) of 90%; a substrate heater temperature of 40° C.; and an RF (high frequency of 13.56 MHz) input power of 5.4 W/cm$^2$ for the target.

Then, in through hole formation, an Ar atmosphere (0.67 Pa) was set in a vacuum chamber, and a RF was supplied to the substrate by power of 2.8 mW/cm$^2$ to carry out plasma etching for 7 minutes. The amount of a platinum oxide left on the substrate was 50 μg/cm$^2$ per substrate area.

Then, in second deposition, a platinum dioxide layer was formed with a thickness of 2 μm. Reactive sputtering conditions were the same as those for the first deposition. An O/Pt mole ratio in the platinum oxide layer was about 2.4.

(Step 2)

Hydrophobic agents were generated in a surface of the platinum oxide according to the well-known technology described in Japanese Patent Application Laid-Open No. 2006-332041. In other words, the platinum oxide layer obtained in Step 1 was brought into contact with steam of 2,4,6,8-tetramethyl tetracyclosiloxane in a sealed container at a room temperature (steam pressure of 1.2 kPa) for 4 minutes, thereby generating a proper amount of hydrophobic agents in the platinum oxide surface. An Si/Pt mole ratio in the platinum oxide layer was 0.18.

(Step 3)

Subsequently, the obtained platinum oxide layer was exposed to a 2% $H_2$/He atmosphere for 30 minutes to be reduced, thereby obtaining a porous platinum catalyst layer having a dendritic shape in a surface of a PTFE sheet. A PT-carrying amount was 0.65 mg/cm$^2$.

After that, 8 μl of a 1 wt % Nafion solution (5% Nafion dispersion solution manufactured by Wako Pure Chemical Industries, Ltd. diluted with IPA to 1%) per catalyst area of 1 cm$^2$ was dropped onto the obtained catalyst layer, and a solvent was volatilized in a vacuum, thereby forming a proton path on the catalyst surface.

Thus, a porous platinum catalyst layer was obtained as a cathode side catalyst layer.

(Step 4)

In order to prepare the anode-side catalyst layer, the platinum-carrying carbon layer was formed to have a PT-carrying amount of 0.3 mg/cm$^2$ on the surface of a PTFE sheet by a doctor blade method. The catalyst slurry used in this case is a mixture of 1 part by mass of platinum-carrying carbon (manufactured by Johnson Matthey, HiSPEC 4000), 0.07 part by mass of Nafion, 1 part by mass of IPA, and 0.4 part by mass of water.

(Step 5)

With the catalyst layer set inside, a polymer electrolyte membrane (Nafion 112, thickness of 50 μm by Dupont) was held between the PTFE sheets having catalyst layers prepared in Steps 3 and 4, and subjected to hot pressing under pressing conditions of 4 MPa, 150° C., and 10 minutes. Then, the PTFE sheets were peeled off from both of the catalyst layers of the anode and cathode sides to be removed, thereby obtaining a MEA. In this MEA, the cathode side catalyst layer is a catalyst layer of the present invention, and the anode side catalyst layer is a platinum carrying carbon catalyst layer.

(Step 6)

The MEA obtained in Step 5 was held by gas diffusion layers 4 and 5 made of MPL carbon cloth (LT 1400-W manufactured by E-TEK, INC.), an anode side electrode 6, a foamed metal 12, and a cathode side electrode 7 in the order illustrated in FIG. 1 to form a fuel cell single unit. Though not illustrated in FIG. 1, surroundings of the gas diffusion layers 4 and 5 were sealed with an O ring 11.

Comparative Example 1

A single unit was formed in the same manner as that of Example 1 except for nonexecution of through hole formation of Step 1. A PT-carrying amount of a cathode side catalyst layer was 0.61 mg/cm$^2$.

Figure 2:
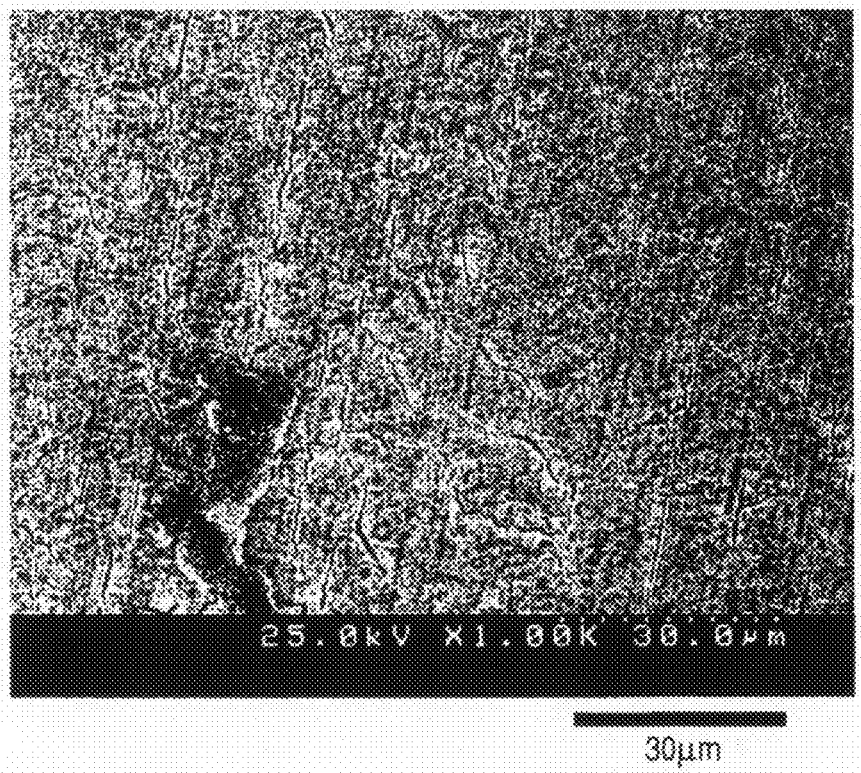
FIG. 2 illustrates a scanning electron micrograph (magnification of ×1,000) of a catalyst layer surface according to Example 1.
Figure 3:
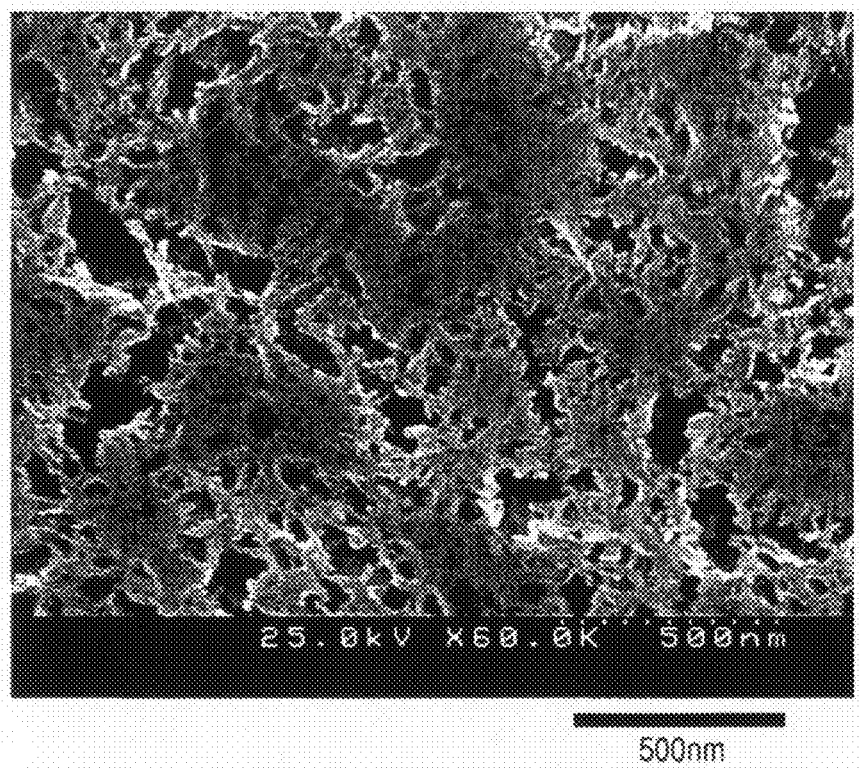
FIG. 3 illustrates a scanning electron micrograph (magnification of ×60,000) of the catalyst layer surface according to Example 1.

FIGS. 2 and 3 illustrate a scanning electron micrograph of a cathode side catalyst layer surface of Example 1 after the removal of the PTFE sheets of Step 5 (surface of a side opposed to the MPL: similarly to Examples and Comparative Examples below unless otherwise specified). FIGS. 4 and 5 illustrate a scanning electron micrograph of a cathode side catalyst layer surface of Comparative Example 1.

As can be understood from the drawings, in Comparative Example 1, the catalyst layer surface included a relatively dense portion, and large cracks of several μm in width were present in a mesh shape between the catalyst layers.

On the other hand, in Example 1, it was observed that the number of large cracks was small, many through holes were formed on the catalyst layer surface, and porosity was higher than that of Comparative Example 1. This is a difference in shape generated by the etching of Step 1.

Example 2

Example 2 is directed to a polymer electrolyte fuel cell of a configuration illustrated in FIG. 1 and manufactured by using the first embodiment of the present invention.

A single unit was formed in the same manner as that of Example 1 except for formation of a platinum oxide layer with a thickness of 1 μm in the second deposition in Step 1. A Pt-carrying amount of a cathode side catalyst layer was 0.35 mg/cm$^2$.

Comparative Example 2

A single unit was formed in the same manner as that of Example 2 except for nonexecution of through hole formation in Step 1. A Pt-carrying amount of a cathode side catalyst layer was 0.31 mg/cm$^2$.

(Evaluation of Examples 1 and 2 and Comparative Examples 1 and 2)

Figure 6:
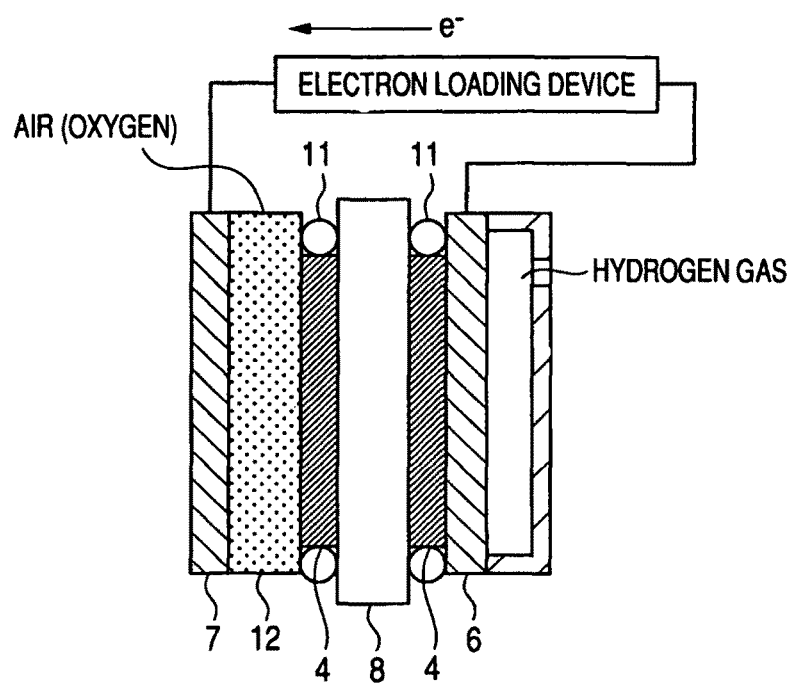
FIG. 6 is a schematic diagram illustrating an evaluation device of a polymer electrolyte fuel cell.

An electron loading device and a hydrogen gas pipe were connected to the fuel cell single units manufactured through the above-mentioned steps as illustrated in FIG. 6 to evaluate power generation characteristics of the fuel cells. In this case, the anode electrode side was filled with a hydrogen gas at a dead end 0.2 MPa, while the cathode electrode side was opened to air. Evaluation of power generation characteristics was carried out at a cell temperature of 25° C. and a relative humidity of an external environment set to 50%.

Figure 7:
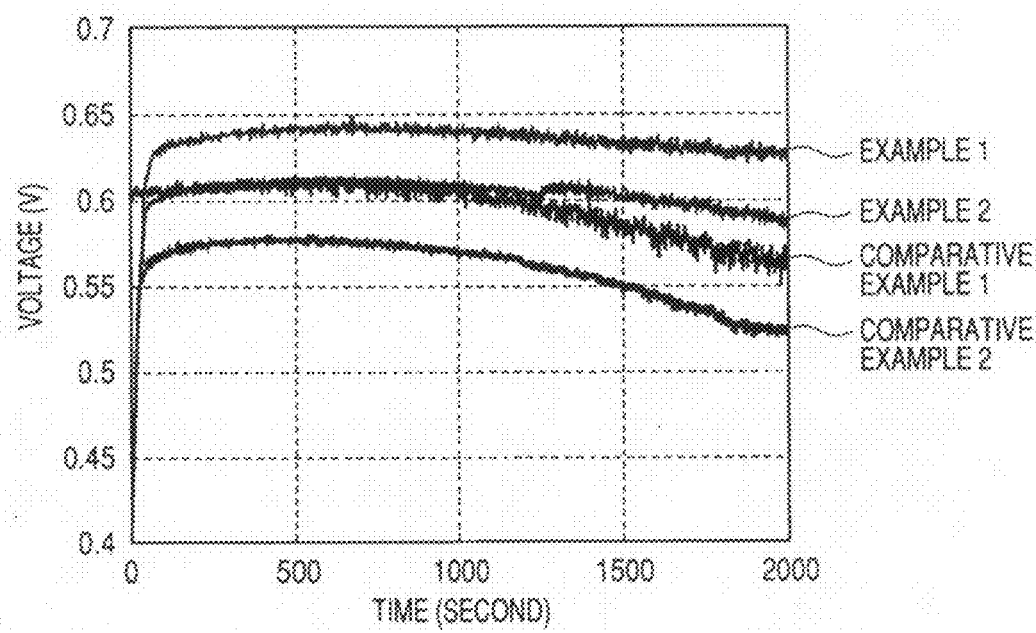
FIG. 7 illustrates time changes in voltage at output current densities of 400 mA/cm$^2$ of the polymer electrolyte fuel cells according to Examples 1 and 2 and Comparative Examples 1 and 2.

FIG. 7 illustrates a time change in cell voltage when power was continuously generated at a current density of 400 mA/cm$^2$.

In FIG. 7, when Example 1 was compared with Comparative Example 1, an average voltage was 0.62 V or more even after a passage of 30 minutes in the case of a single unit using the catalyst layer of Example 1, while an average voltage was 0.56 V in the case of a single unit of Comparative Example 1, which was lower by about 60 mV than that of Example 1. "Average" means an average of voltages obtained by removing short-term voltage fluctuation (noise) in a measuring result.

The Pt amount of Example 1 is larger by 40 μg/cm$^2$ than that of Comparative Example 1. However, since this difference is very small, the difference may not generate a voltage difference of 60 mV.

When Example 2 was compared with Comparative Example 2, an average voltage was 0.58 V or more even after a passage of 30 minutes in the case of a single unit using the catalyst layer of Example 2, while an average voltage was 0.52 V in the case of a single unit of Comparative Example 2, which was lower by about 60 mV than that of Example 2.

The results indicate that the fuel cells (single units) of Examples 1 and 2 are much greater in output and output stability (power generation stability) compared with the fuel cells (single units) of Comparative Examples 1 and 2. Such results are obtained because the cathode side catalyst layers of Examples 1 and 2 have through holes, and therefore generated water scattering and water discharging performances are higher compared with those of Comparative Examples 1 and 2.

In FIG. 7, when Example 2 is compared with Comparative Example 1, while the Pt amount of the catalyst layer of Example 2 is about 60% of that of the catalyst layer of Comparative Example 1, a voltage higher than that of Comparative Example 1 could be maintained for a long time.

In other words, the manufacturing method of the present invention improves catalyst use efficiency, thereby enabling acquisition of a much higher fuel cell output at a smaller Pt amount.

Figure 8:
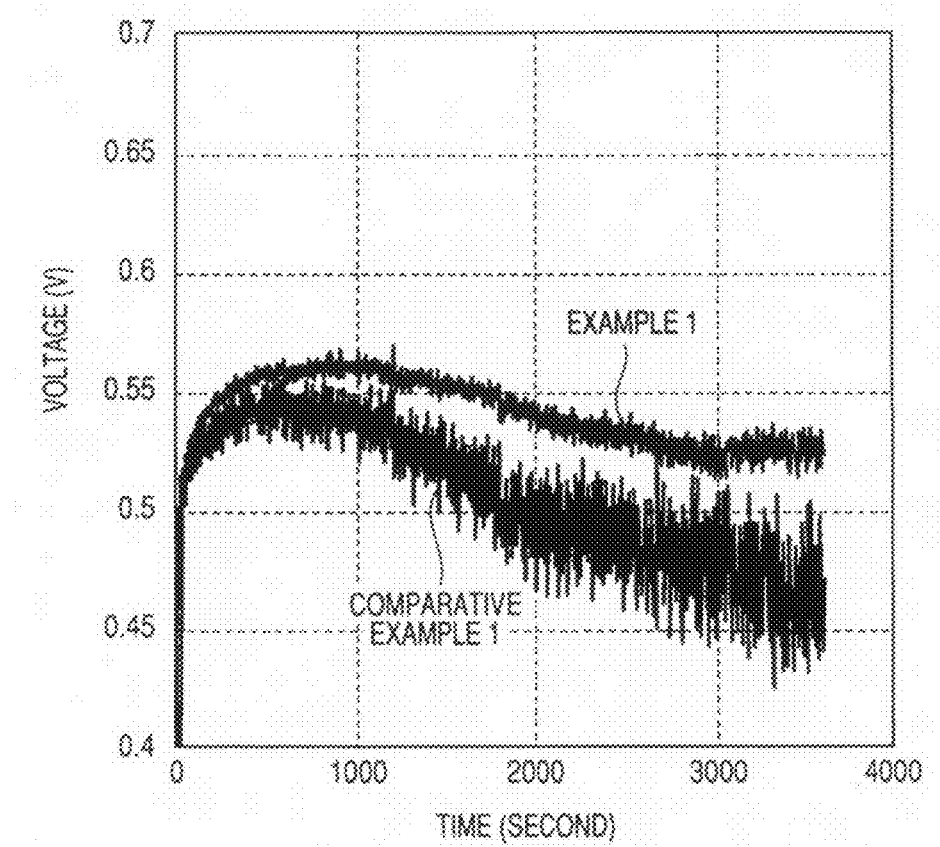
FIG. 8 illustrates time changes in voltage at output current densities of 450 mA/cm$^2$ of the polymer electrolyte fuel cells according to Example 1 and Comparative Example 1.

FIG. 8 illustrates time changes in cell voltage when power is continuously generated at a current density of 450 mA/cm$^2$ for the single units of the Embodiment 1 and Comparative Example 1.

In FIG. 8, when Example 1 was compared with Comparative Example 1, an average voltage was 0.52 V or more even after a passage of 1 hour (3,600 seconds) in the case of the single unit using the catalyst layer of Example 1, while an average voltage was 0.46 V in the case of the single unit of Comparative Example 1, which was lower by about 60 mV than that of the Embodiment 1.

The voltage gradually dropped with a passage of power generating time in the case of Comparative Example 1. However, in the case of the single unit of Example 1, no voltage reduction occurred after a passage of 3,000 seconds.

This indicates that when power was continuously generated at a current density of 450 mA/cm$^2$, a retained water amount increased with a passage of power generating time in the case of Comparative Example 1 because the amount of generated water in the catalyst layer exceeded a scattering amount, but the amount of retained water did not increase over a predetermined level in Example 1 because a generated water scattering amount was larger than that of Comparative Example 1.

Example 3

Example 3 is directed to a polymer electrolyte fuel cell of a configuration illustrated in FIG. 1 and manufactured by using the second embodiment of the present invention.
(Step A)
A substantially linear irregularity was formed with a depth of about 1 μm in a PTFE sheet (product name Nitoflon manufactured by Nitto Denko Corporation) by rubbing. Cloth used for the rubbing was carbon cloth (LT 1400-W manufactured by E-TEK, Inc.). A cloth-exposed surface was manually rubbed in a fixed direction in contact with the PTFE sheet to form a substantially linear irregularity.

Steps thereafter were all the same as those of Step 1 and the following steps of Example 1 to manufacture a fuel cell single unit.

Example 4

A fuel cell single unit was manufactured in the same manner as that of Example 3 except for plasma etching time of 8 minutes.

Comparative Example 3

A fuel cell single unit was manufactured in the same manner as that of Example 3 except for nonexecution of through hole formation.

Figure 9:
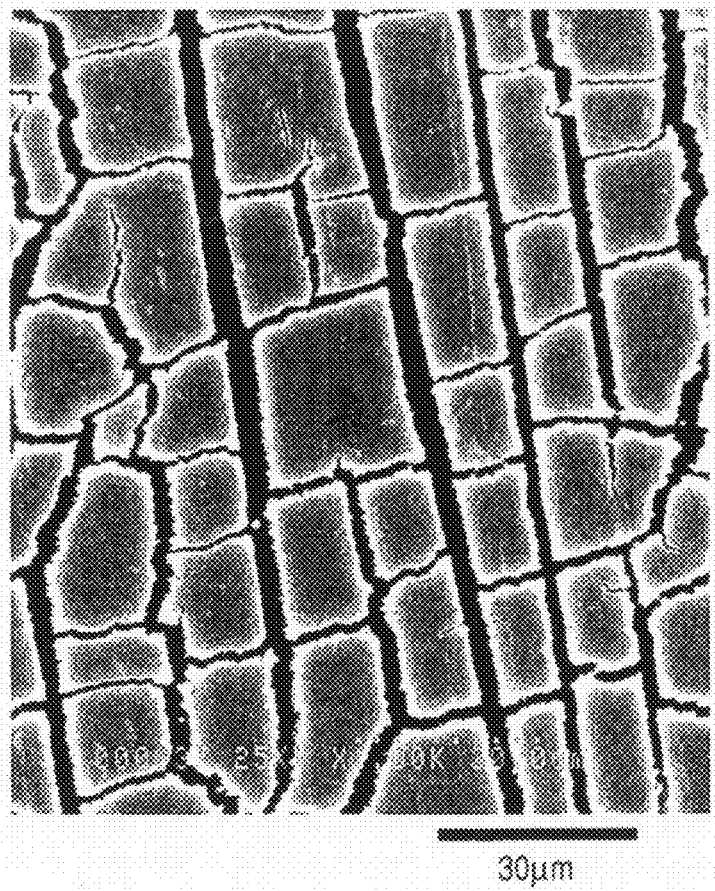
FIG. 9 illustrates a scanning electron micrograph (magnification of ×1,000) of a catalyst layer surface according to Example 3.
Figure 10:
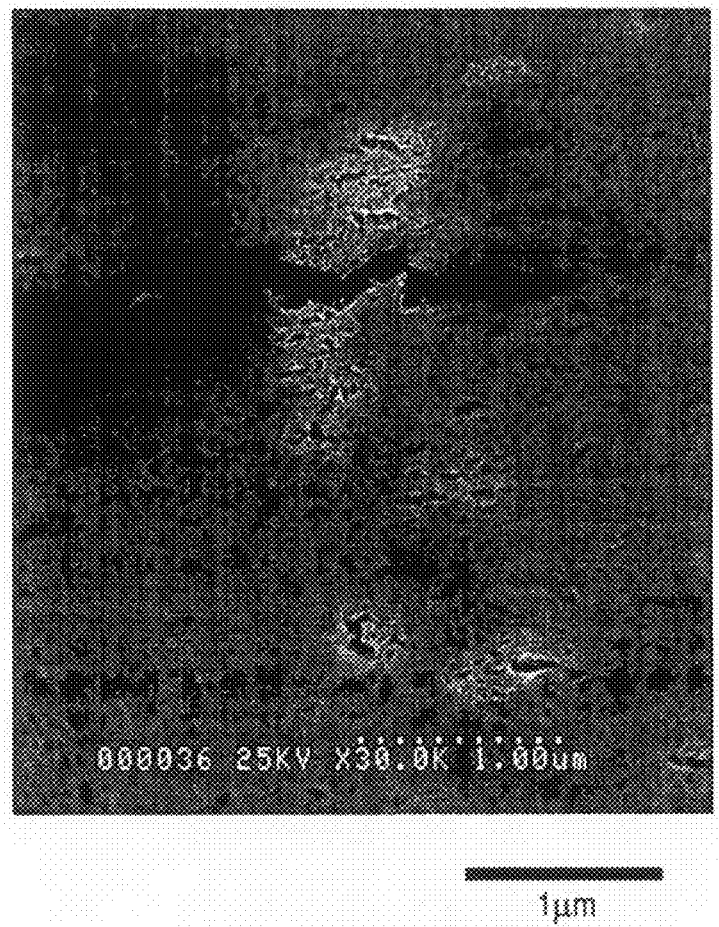
FIG. 10 illustrates a scanning electron micrograph (magnification of ×30,000) of the catalyst layer surface according to Example 3.
Figure 11:
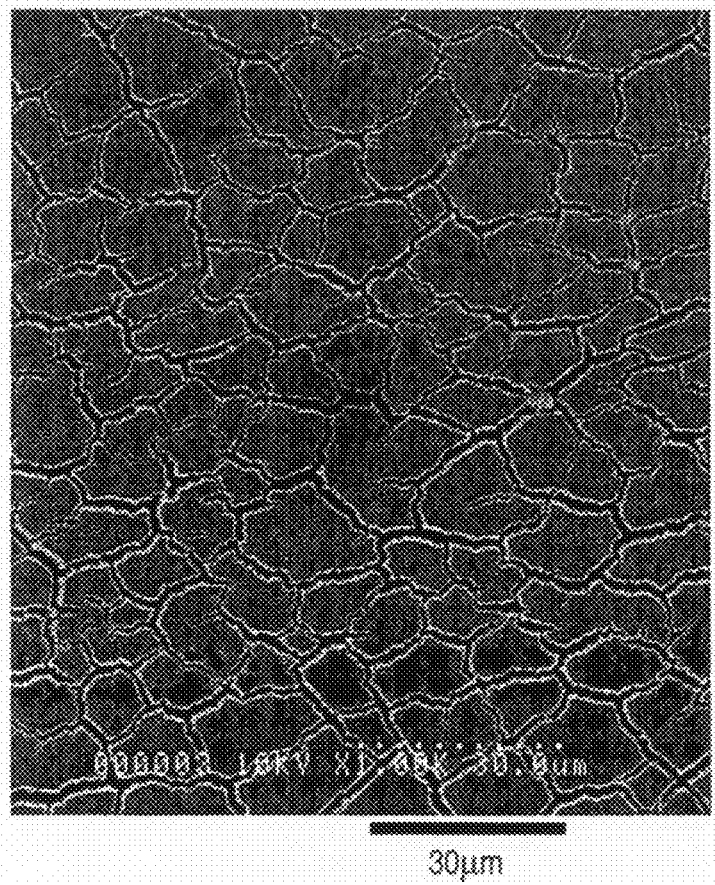
FIG. 11 illustrates a scanning electron micrograph (magnification of ×1,000) of a catalyst layer surface according to Comparative Example 3.

FIGS. 9 and 10 illustrate a scanning electron micrograph of a cathode side catalyst layer surface after removal of the PTFE sheet of Example 3. FIG. 11 illustrates a scanning electron micrograph of a cathode side catalyst layer surface after removal of the PTFE sheet of Comparative Example 3.

As illustrated in FIG. 9, in Example 3, many roughly linear cracks of several μm in width were formed together with meshed cracks in the catalyst layer. As illustrated in FIG. 10, in Example 3, many through holes were formed in the catalyst layer surface as in the case of Example 1.

On the other hand, as illustrated in FIG. 11, in Comparative Example 3, only meshed cracks were formed while no streaky crack appeared. In Comparative Example 3, the catalyst layer surface included a relatively dense portion as in the case of Comparative Example 1.

Since the irregularity formed in the transfer sheet was roughly linear in shape, the roughly linear cracks observed in Example 3 may be cracks (cracks C) reflecting a height difference between the recessed and protruded portions. The other meshed cracks may be cracks (cracks A and B) formed with volume contraction caused by reduction of the catalyst layer or swelling of the electrolyte membrane. Based on comparison of FIG. 10 with FIG. 11, the formation of through holes in the dense layer may contribute to formation of the cracks C in catalyst layer surface.

(Evaluation of Examples 3 and 4 and Comparative Example 3)

Figure 12:
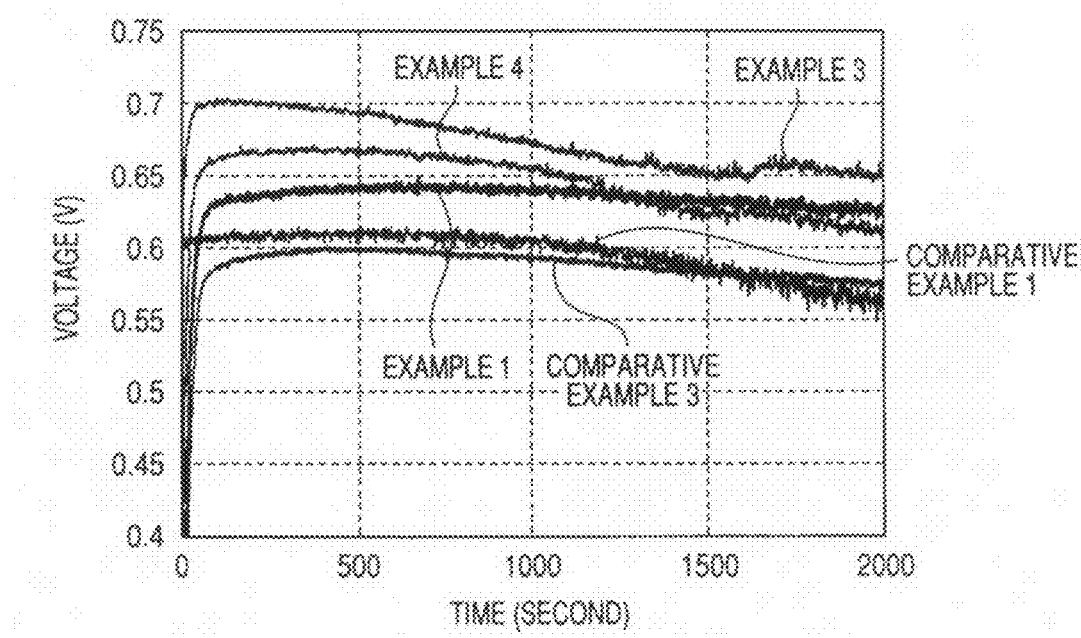
FIG. 12 illustrates time changes in voltage at output current densities of 400 mA/cm$^2$ of the polymer electrolyte fuel cells according to Example 3 and Comparative Examples 1 and 3.

FIG. 12 illustrates time changes in cell voltage of the fuel cell single units of Examples 3 and 4 when power was continuously generated at a current density of 400 mA/cm$^2$ together with the result of the fuel cell single units of Example 1 and Comparative Examples 1 and 3 as in the case of the evaluation of Example 1.

When Example 3 was compared with Comparative Examples 1 and 3, an average voltage was 0.65 V or more even after a passage of 30 minutes in the case of a single unit using the catalyst layer of Example 3, while voltages were about 0.57 V in the case of single units of Comparative Examples 1 and 3, which were lower by about 80 mV than that of Example 3.

When Example 4 was compared with Comparative Examples 1 and 3, an average voltage was 0.60 V or more even after a passage of 30 minutes in the case of a single unit using the catalyst layer of Example 4, while voltages were about 0.57 V in the case of single units of Comparative Examples 1 and 3, which were lower by about 30 mV than that of Example 4.

When Example 3 was compared with Example 1, a voltage after 30 minutes was higher by 20 mV in Example 3 than that in Example 1. When highest voltages were compared, a highest voltage was 0.7 V in Example 3, which was higher by 60 mV than a highest voltage of 0.64 V of Example 1.

When highest voltages are compared between Examples 4 and 1, a highest voltage was 0.67 V in Example 4, which was higher by 30 mV than a highest voltage of 0.64 V of Example 1.

The result indicates that the fuel cells (single units) of Examples 3 and 4 are much greater in output and output stability (power generation stability) than the fuel cell (single unit) of Example 1. This result is obtained because the cathode side catalyst layers of Examples 3 and 4 include cracks C in addition to the through holes, and therefore generated water scattering and water discharging performances are much higher compared with Example 1. In other words, simultaneous formation of the irregularity in the transfer sheet and the through hole in the dense layer of the catalyst layer greatly improves generated water scattering of the catalyst layer, thereby enhancing output and output stability of the fuel cell.

Example 5

Example 5 is directed to a polymer electrolyte fuel cell of a configuration illustrated in FIG. 1 and manufactured by using the second embodiment of the present invention.
(Step A)
A substantially linear irregularity was formed in a PTFE sheet (Nitoflon, manufactured by Nitto Denko Corporation) as a transfer sheet by polishing. A polishing sheet used for the polishing was an alumina polishing sheet (WA 400-75FEZ-A, manufactured by Nihon Micro Coating Co., Ltd.). A rubber roll was pressed from above the polishing sheet to polish the PTFE sheet in a fixed direction to form a substantially linear irregularity. In this case, a pressing force was 2 kg/cm$^2$, rubber roll hardness was 60 degrees, and a polishing sheet moving speed was 1,400 mm/minute. The Ra of the PTFE sheet after the polishing was 0.46 μm.

In subsequent Steps, a fuel cell single unit was manufactured in the same manner as those of Step 1 and thereafter of Example 1.

Example 6

A fuel cell single unit was manufactured in the same manner as that of Example 5, except for use of WA 1000-75FEZ-A as the polishing sheet in Example 6. The Ra of the PTFE sheet after the polishing was 0.26 μm.

Figure 13:
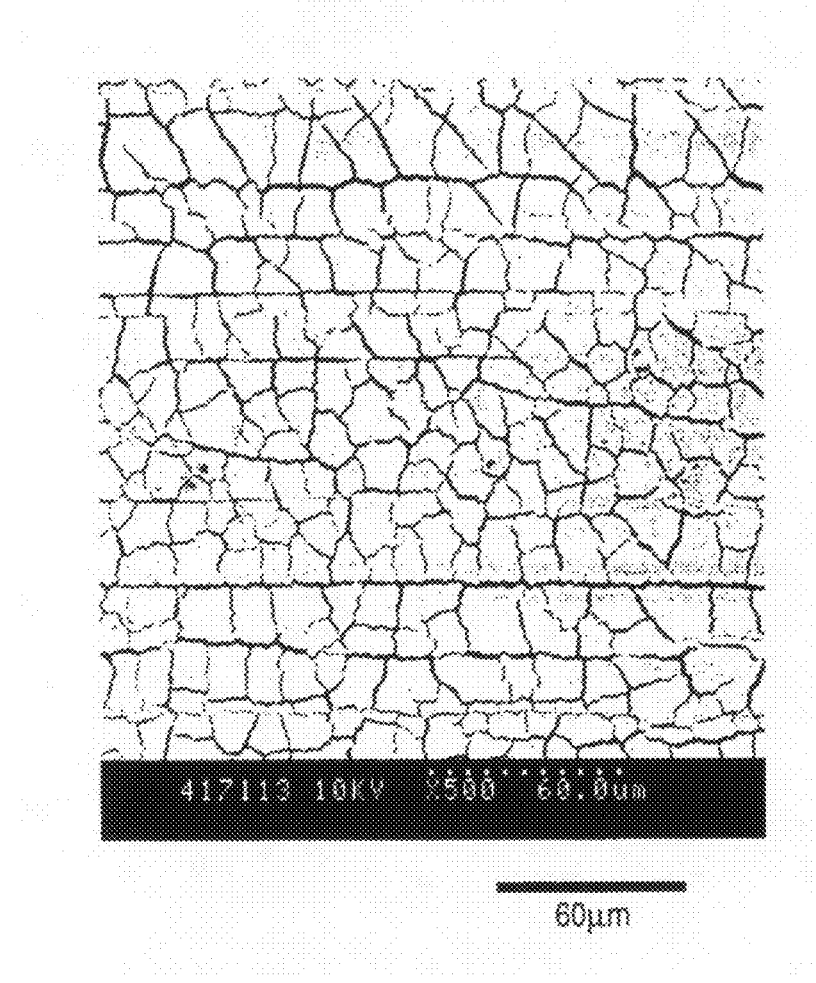
FIG. 13 illustrates a scanning electron micrograph (magnification of ×500) of a catalyst layer surface according to Example 5.
Figure 14:
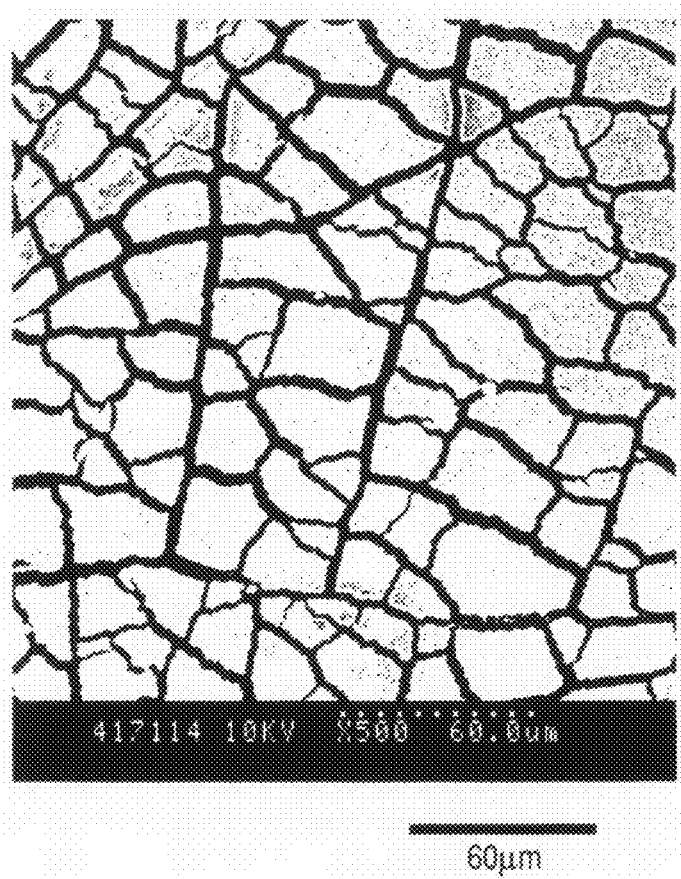
FIG. 14 illustrates a scanning electron micrograph (magnification of ×500) of a catalyst layer surface according to Example 6.

FIG. 13 illustrates a scanning electron micrograph of a cathode side catalyst layer surface after removal of the PTFE sheet of Example 5. FIG. 14 illustrates a scanning electron micrograph of a cathode side catalyst layer surface after removal of the PTFE sheet of Example 6.

As illustrated in FIG. 13, in Example 5, many substantially linear cracks of several μm in width were formed together with meshed cracks in the catalyst layer. Though not clearly illustrated, many through holes were formed in the catalyst layer surface of Example 5 as in the case of Example 1.

On the other hand, as illustrated in FIG. 14, in Example 6, only meshed cracks were formed while no substantially linear crack appeared on the catalyst layer surface. This result illustrates that when an irregularity is formed in the transfer sheet by polishing, unless the Ra is 0.3 μm or more, no cracks C are formed.

Figure 15:
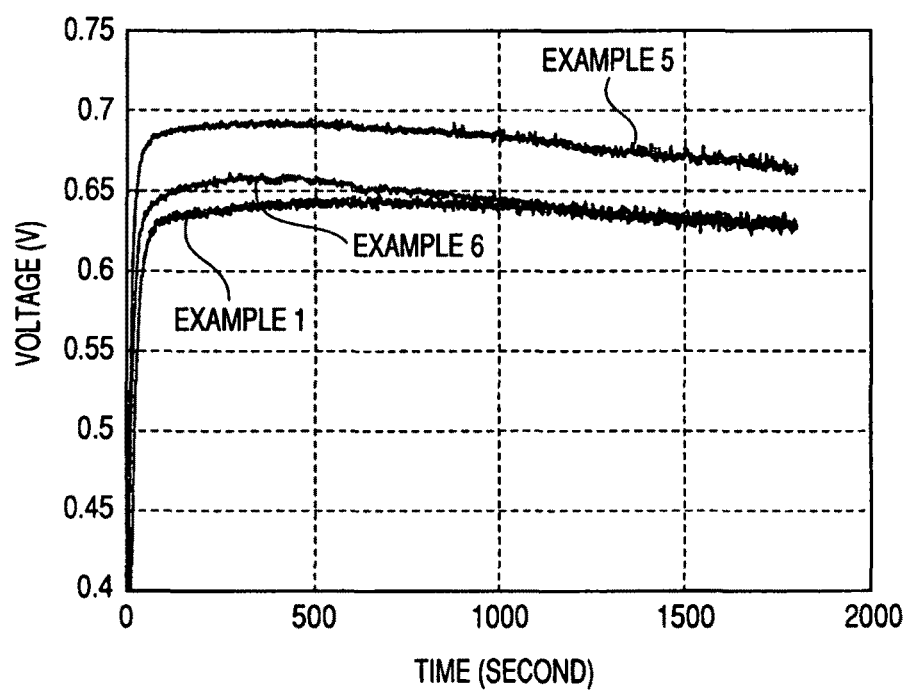
FIG. 15 illustrates time changes in voltage at output current densities of 400 mA/cm$^2$ of polymer electrolyte fuel cells according to Examples 5 and 6.

(Evaluation of Example 5 and Example 6)
FIG. 15 illustrates time changes in unit voltage of the fuel cell single unit of Example 5 when power was continuously generated at a current density of 400 mA/cm$^2$ together with a result of the fuel cell single units of Example 6 and Example 1 in the same manner as the evaluation of Example 1.

When Example 5 is compared with Example 6, an average voltage is 0.66 V or more even after a passage of 30 minutes in the case of a single unit using the catalyst layer of Example 5, while an average voltage is about 0.625 V in the case of a single unit of Example 6, so Example 5 is about 35 mV higher than that of Example 6.

When highest voltages are compared, a highest voltage is about 0.69 V in Example 5, which is 30 mV higher than a highest voltage of about 0.66 V of Example 6. When Example 6 is compared with Example 1, the highest voltage of Example 6 is about 20 mV higher than that of Example 1, but becomes equal to that of Example 1 after a passage of 30 minutes.

In other words, in this Example, when an irregularity is formed in the transfer sheet by polishing, by setting the Ra to 0.3 μm or more, satisfactory effects of the second embodiment can be obtained.

Figure 16:
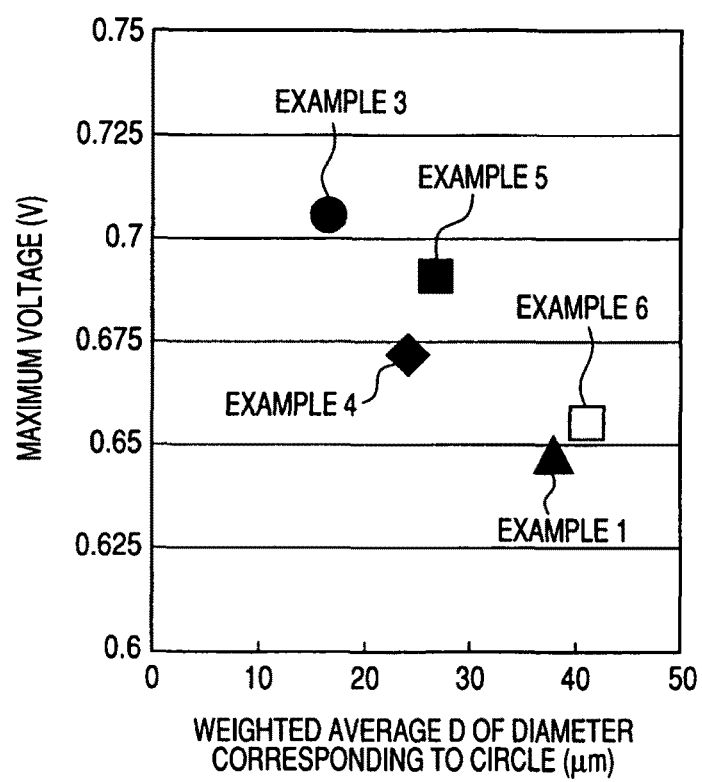
FIG. 16 illustrates a relation between a weighted average of a diameter corresponding to a circle of a catalyst grain and a maximum output voltage of a fuel cell.

FIG. 16 illustrates a relation between a weighted average D of a diameter of a substantially circle of a catalyst grain of each of Examples 1, and 3 to 6 and a maximum voltage of the fuel cell single unit when power is continuously generated at a current density of 400 mA/cm$^2$.

Figure 17:
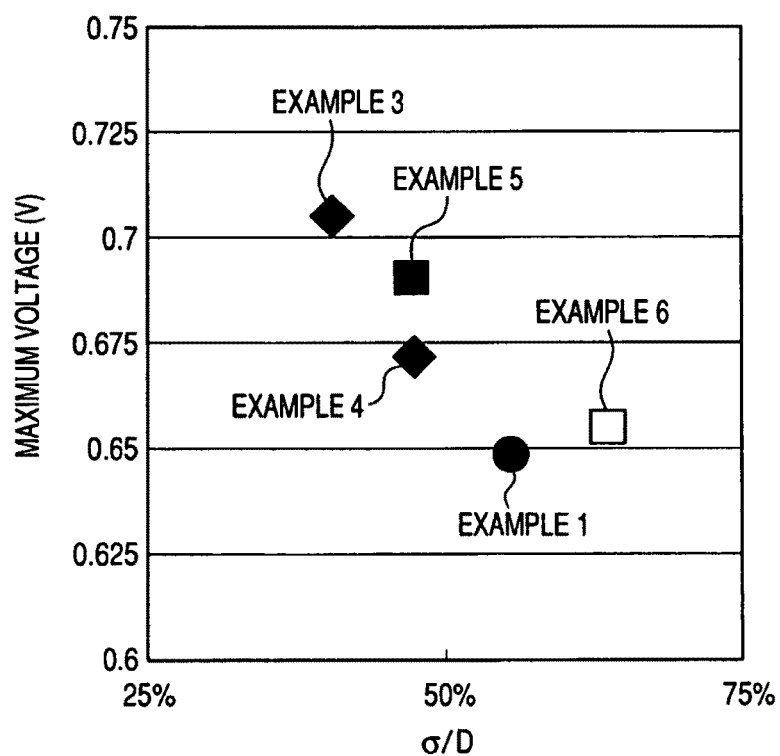
FIG. 17 illustrates a relation between a ratio (σ/D) of the weighted average of the diameter corresponding to the circle of the catalyst grain to standard deviation and the maximum output voltage of the fuel cell.
Figure 18:
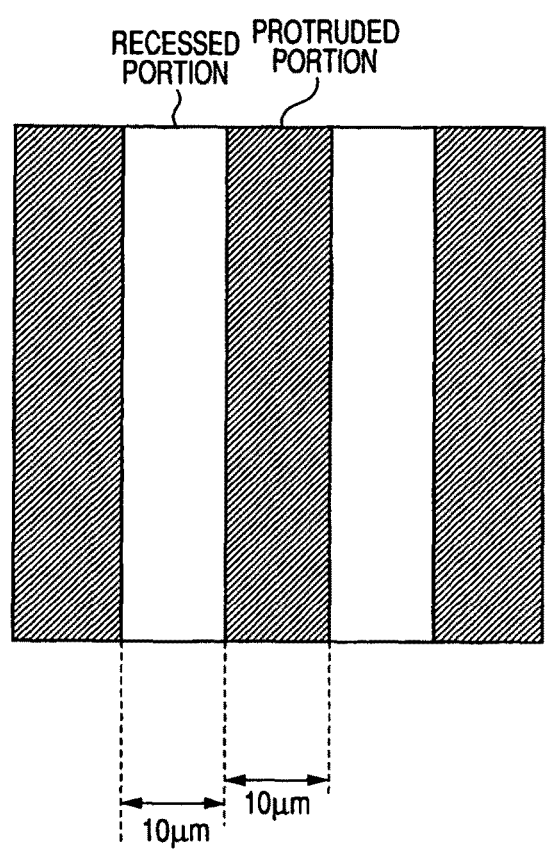
FIG. 18 is a schematic diagram illustrating an irregularity shape imparted to an Si substrate according to Example 7.
Figure 19:
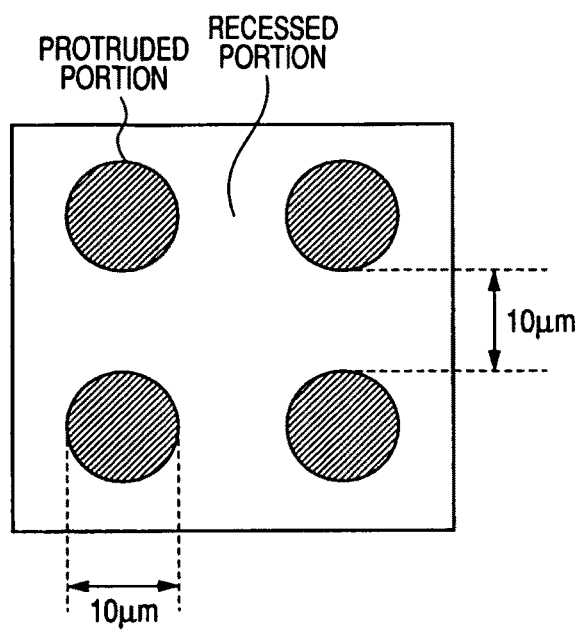
FIG. 19 is a schematic diagram illustrating an irregularity shape imparted to the Si substrate according to Example 7.
Figure 20:
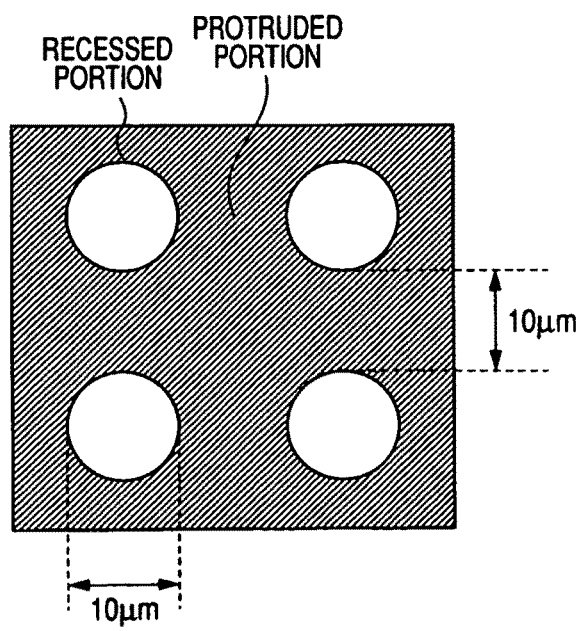
FIG. 20 is a schematic diagram illustrating an irregularity shape imparted to the Si substrate according to Example 7.

Similarly, FIG. 17 illustrates a relation between a ratio σ/D between standard deviation σ of the diameter of the substantially circle of the catalyst grain of each of Examples 1, and 3 to 6 and D, and a maximum voltage of the fuel cell single unit when power is continuously generated at a current density of 400 mA/cm$^2$.

For calculation of D and σ, image analysis software (A-zo kun, manufactured by Asahi Kasei Corporation) was used. In electron microscope observation, four spots for an arbitrary portion of the catalyst layer were shot each by 0.02 mm$^2$ at a magnification of 500 times. Each was subjected to particle analysis to obtain a circumferential length S(n) of each catalyst grain. For only partially and slightly connected catalyst grains, limited to catalyst grains of 5 μm or less in minimum width of connected portions, considering that cracks substantially cut the catalyst grains, analysis was carried out by regarding the grains as other catalyst grains.

It can be understood from FIGS. 16 and 17, as D and σ/D are smaller, a maximum voltage of the single unit tends to be larger. Especially, in Examples 3 to 5 of D<35 μm and σ/D<50%, single unit voltages are much greater as compared with Examples 1 and 6.

Such a result is obtained because for the cathode side catalyst layers of Examples 3 to 5, formation of cracks C in addition to formation of the through holes of the catalyst layer dense layer of the first embodiment reduces sizes of catalyst grains and size variation, and thus substance diffusion is higher as compared with Examples 1 and 6.

In other words, the simultaneous formation of the irregularity in the transfer sheet and the through hole in the dense layer of the catalyst layer greatly improves generated water scattering of the catalyst layer, thereby improving an output of the fuel cell.

Example 7

This Example is directed to a membrane electrode assembly 8 of FIG. 1 manufactured according to the second embodiment of the present invention.
(Step A)
Irregularity patterns of three regular shapes of line, dot and hole were formed in an Si substrate through a photolithography process and a dry etching process. A space interval between recessed and protruded portions was 10 μm, and a minimum width of the protruded portion was also 10 μm. A height difference between the recessed and protruded portions was 2 μm.

Next, by using Rhino top (product name, manufactured by Asahi Glass Co., Ltd.), a fluorocarbon resin film (thickness of 0.1 μm or less) was deposited as a releasing layer on an Si substrate.

By using the Si substrate having this releasing layer as a transfer sheet, with subsequent steps set all similar to Steps 1 to 5 of Example 1, a membrane electrode assembly was manufactured.

Example 8

A membrane electrode assembly was manufactured in the same manner as Example 7, except for setting of a space interval between recessed and protruded portions to 50 μm and a minimum width of the protruded portion to 50 μm.

Example 9

A membrane electrode assembly was manufactured in the same manner as Example 8, except for setting of a height difference between recessed and protruded portions to 10 μm.

Example 10

A membrane electrode assembly was manufactured in the same manner as Example 7, except for setting of a space interval between recessed and protruded portions to 5 μm and a minimum width of the protruded portion to 5 μm.

Example 11

A membrane electrode assembly was manufactured in the same manner as Example 7, except for setting of a space interval between recessed and protruded portions to 1 μm and a minimum width of the protruded portion to 1 μm.

Example 12

A membrane electrode assembly was manufactured in the same manner as Example 9, except for setting of a space interval between recessed and protruded portions to 5 μm and a minimum width of the protruded portion to 5 μm.

Example 13

A membrane electrode assembly was manufactured in the same manner as Example 9, except for setting of a space interval between recessed and protruded portions to 1 μm and a minimum width of the protruded portion to 1 μm.

Example 14

A membrane electrode assembly was manufactured in the same manner as Example 7, except for setting of a height difference between recessed and protruded portions to 10 μm.

Tables 1 and 2 show irregularity shape conditions of Examples 7 to 14 and results of presence/absence of catalyst layers left in the Si substrates after transfer.

TABLE 1

Height difference between recessed and protruded portions = 2 μm

| Irregularity shape | Space interval (μm) | | | |
|---|---|---|---|---|
| | 50 | 10 | 5 | 1 |
| Line | Example 8 | Example 7 | Example 10 | Example 11 |
| Dot | Absence of layer left after transfer | Presence of layer left after transfer | Presence of layer left after transfer | Presence of layer left after transfer |
| Hole | | Example 7 Absence of layer left after transfer | | |

TABLE 2

Height difference between recessed and protruded portions = 10 μm

| Irregularity shape | Space interval (μm) | | | |
|---|---|---|---|---|
| | 50 | 10 | 5 | 1 |
| Line | Example 9 | Example 14 | Example 12 | Example 13 |
| Dot | Absence of layer left after transfer | Presence of layer left after transfer | Presence of layer left after transfer | Presence of layer left after transfer |
| Hole | | | | |

Tables clearly show that, in Examples 7 to 9, almost no catalyst layer is left in the Si substrate after the transfer process except the hole shape.

On the other hand, in the case of the hole irregularity shape of Example 7, and Examples 10 to 14, during the transfer, most of the catalyst layer of the recessed portion is not transferred, and a great amount of the catalyst layer is left in the recessed portion of the Si substrate after the transfer.

Those results show that when an irregularity depth of the Si substrate is 2 μm, and an irregularity shape is line or dot, if a space interval exceeds 5 μm, almost all of the catalyst layer of the recessed portion is transferred together with the catalyst layer of the protruded portion to the electrolyte membrane.

Those results also show that when the irregularity depth is 10 μm, if the space interval exceeds 10 μm, irrespective of the irregularity shape, the catalyst layer of the recessed portion is transferred together with the catalyst layer of the protruded portion to the electrolyte membrane.

Figure 21:
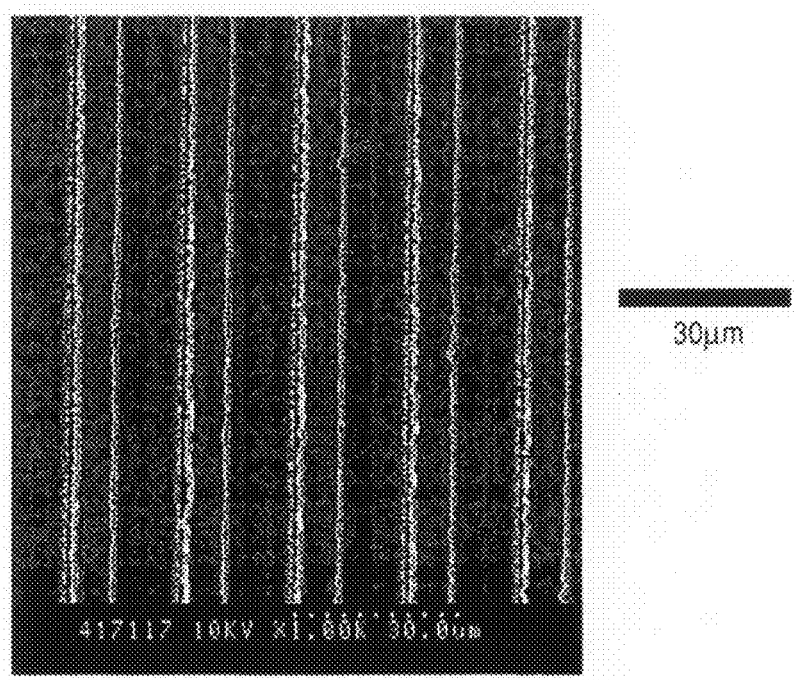
FIG. 21 illustrates a cathode side catalyst layer surface of a membrane electrode assembly according to Example 7 (magnification of ×1,000).
Figure 22:
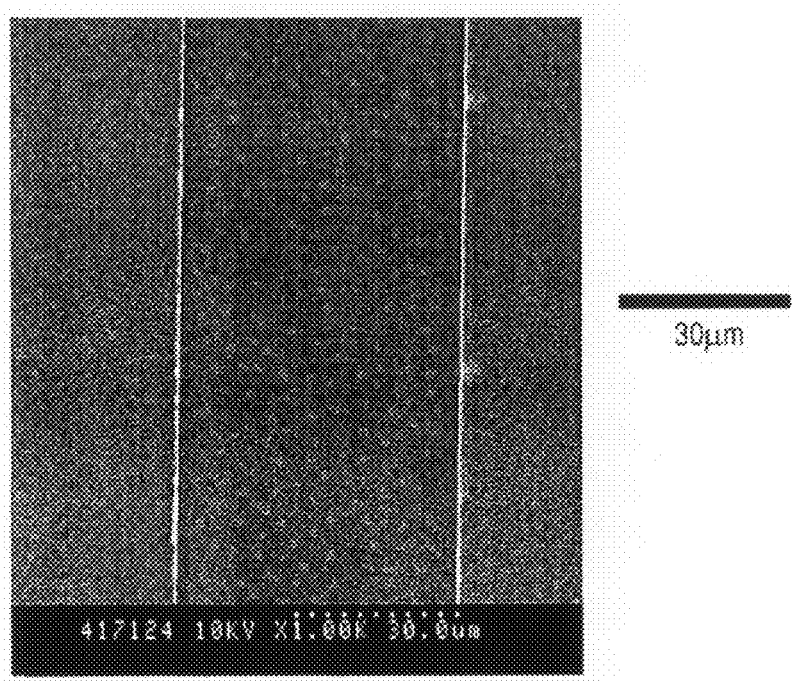
FIG. 22 illustrates a cathode side catalyst layer surface of a membrane electrode assembly according to Example 8 (magnification of ×1,000).

FIGS. 21 and 22 illustrate scanning electron micrographs of surfaces of cathode side catalyst layers (surfaces opposed to the MPL) after removal of release sheets of the membrane electrode assemblies of Examples 7 and 8 (irregularity shape=line).

As illustrated in FIGS. 21 and 22, white lines are observed at places corresponding to positions of steps between recessed and protruded portions of the catalyst layers. The white lines are similarly observed in the other irregularity shapes.

Figure 23:
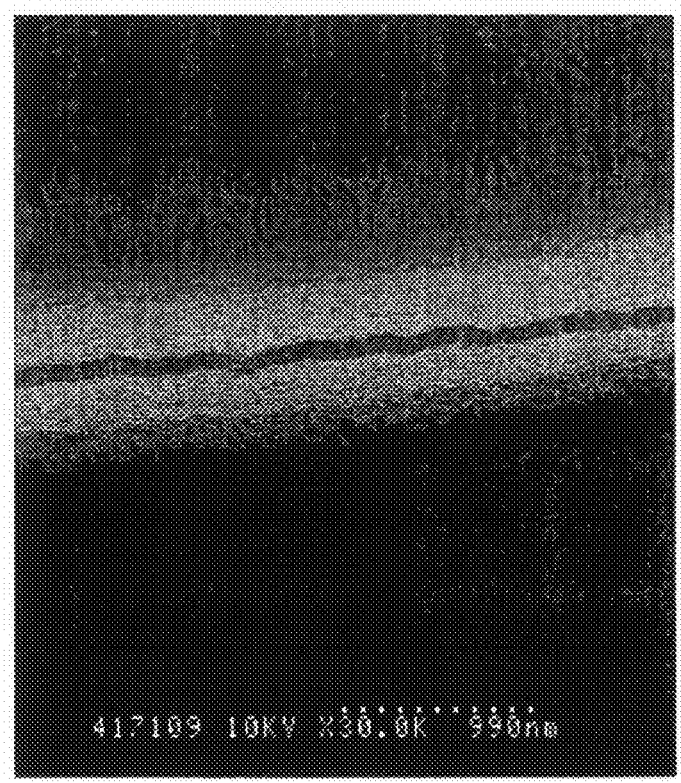
FIG. 23 illustrates an enlarged image of a catalyst layer according to Example 8 (magnification of ×30,000, and tilt angle of)15°.

FIG. 23 is an enlarged overhead view of a portion seen to be a white line when an irregularity shape is dot, in Example 8. As illustrated in FIG. 23, portions of white lines in FIGS. 21 and 22 are cracks reflecting a step between recessed and protruded portions. The same applies to the case of the other irregularity shapes.

In other words, when the catalyst layer of the recessed portion is transferred, cracks C are formed in all of the catalyst layer of the step between the recessed and protruded portions.

As is obvious from FIGS. 21 and 22, under such irregularity dimension conditions, only cracks C were observed, while cracks A or B were hardly observed. Therefore, when an interval between the cracks C is equal to or smaller than 50 μm, the cracks C cause stress relaxation in the catalyst layer, and thus the cracks A and B are less likely to be formed.

Example 15

A single unit was manufactured in the same manner as Example 1, except for setting of plasma etching time to 1 minute in Step 1. A platinum oxide left on a sheet after formation of a through hole was 84 μg/cm² per substrate area.

Example 16

A single unit was manufactured in the same manner as Example 1, except for setting of plasma etching time to 3 minutes in Step 1. A platinum oxide left on a sheet after formation of a through hole was 75 μg/cm² per substrate area.

Example 17

A single unit was manufactured in the same manner as Example 1, except for setting of plasma etching time to 8 minutes in Step 1. A platinum oxide left on a sheet after formation of a through hole was 52 μg/cm² per substrate area.

Example 18

A single unit was manufactured in the same manner as Example 1, except for setting of total pressure to 3 Pa during first deposition and plasma etching time to 8 minutes during formation of a through hole in Step 1. A platinum oxide left on a sheet after formation of a through hole was 56 μg/cm² per substrate area.

Example 19

A single unit was manufactured in the same manner as Example 1, except for setting of total pressure to 8 Pa during first deposition and plasma etching time to 8 minutes during formation of a through hole. A platinum oxide left on a sheet after formation of a through hole was 40 μg/cm² per substrate area.

(Evaluation of Examples 15 to 19)

The electron loading device and the hydrogen gas pipe were connected to each of the fuel cell single units manufactured through the above-mentioned steps as illustrated in FIG. 6 to evaluate power generation characteristics of the fuel cells. In this case, the anode electrode side was filled with hydrogen gas at a dead end of 0.2 MPa, while the cathode electrode side was opened to the air. The evaluation of power generation characteristics was carried out at a cell temperature of 25° C. and a relative humidity of an external environment of 100%.

A testing method was as follows. Sweeping was executed at a current sweeping speed of 0.1 mA/cm²/second from an open circuit voltage (OCV) to a current density of 1 A/cm², and then sweeping was executed to 0 V at 1 mA/cm²/second to evaluate voltage-current density characteristics of each unit.

Under this condition, since the anode side is dead-ended, water evaporation from the anode side does not occur. Further, the air humidity on the cathode side is 100% RH, so the water evaporation amount from the cathode side is small. That is, under this condition, water movement to the outside of the unit is suppressed, so the flooding in the cathode easily occurs. Further, the sweep rate of the current value at the time of measurement is low, and a power generation time at the time of measurement becomes longer to produce a large amount of water. Accordingly, the flooding easily occurs in the fuel cell when a current density is high. By comparing the membrane electrode assembly of each Example with that of each Comparative Example under such a condition that flooding easily occurs, a size of substance diffusion in the cathode catalyst layer of each membrane assembly can be evaluated. Thus, effects can be easily determined.

Figure 24:
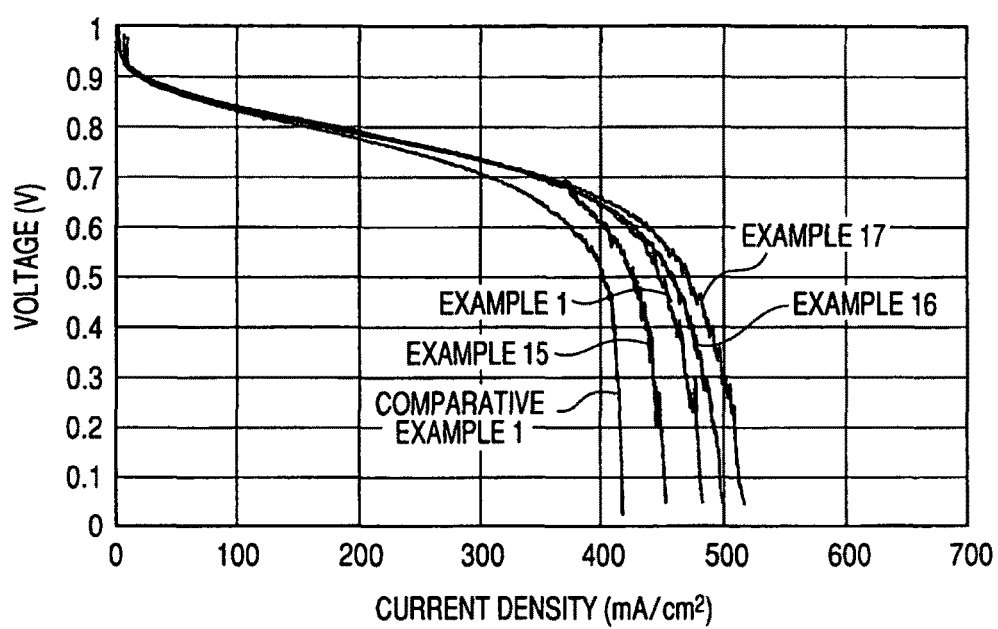
FIG. 24 illustrates voltage-current density characteristics of fuel cell units according to Example 1, and Examples 15 to 17, and Comparative Example 1.
Figure 25:
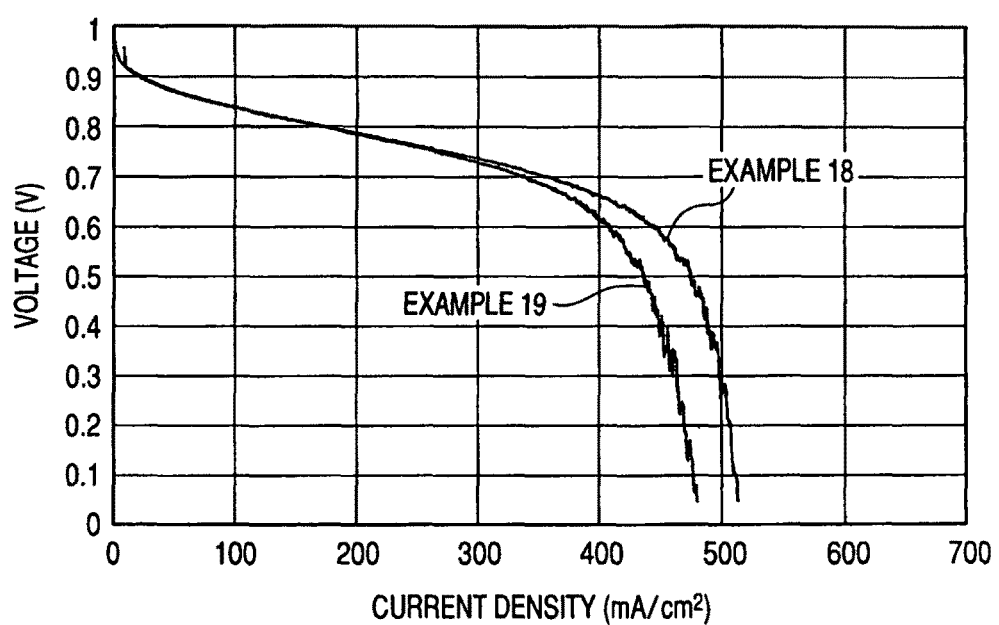
FIG. 25 illustrates voltage-current density characteristics of fuel cell units according to Examples 18 and 19.

FIG. 24 illustrates a result of voltage-current density characteristics of the fuel cell single units of Examples 15 to 17 together with a result of the fuel cell single units of Example 1 and Comparative Example 1. FIG. 25 illustrates a result of voltage-current density characteristics of the fuel cell single units of Examples 18 and 19.

As is obvious from FIGS. 24 and 25, an output current density at 0.4 V was about 410 mA/cm² in Comparative Example 1, while output current densities were about 440 mA/cm² or more in Examples 1 and 15 to 17, which were as higher as 20 mA/cm² or more. Especially, in Example 17, an output current density was 490 mA/cm², which was as higher as 70 mA/cm².

A current density of Example 19 was 450 mA/cm², which was larger than that of Comparative Example 1 but smaller than those of Examples 1 and 18 irrespective of equal etching time. It is conceivable that because a thickness of a dense layer of Example 19 was small, the amount of a Pt oxide left on a sheet after formation of a through hole was too small for 8-minute etching. In other words, in Example 19, because the amount of a Pt oxide after formation of a through hole was less than 50 μg/cm², a dense layer was formed again in subsequent second deposition, causing a greater reduction in through hole opening ratio than those of Examples 11 and 12, and an output current density was reduced as a result.

Figure 26:
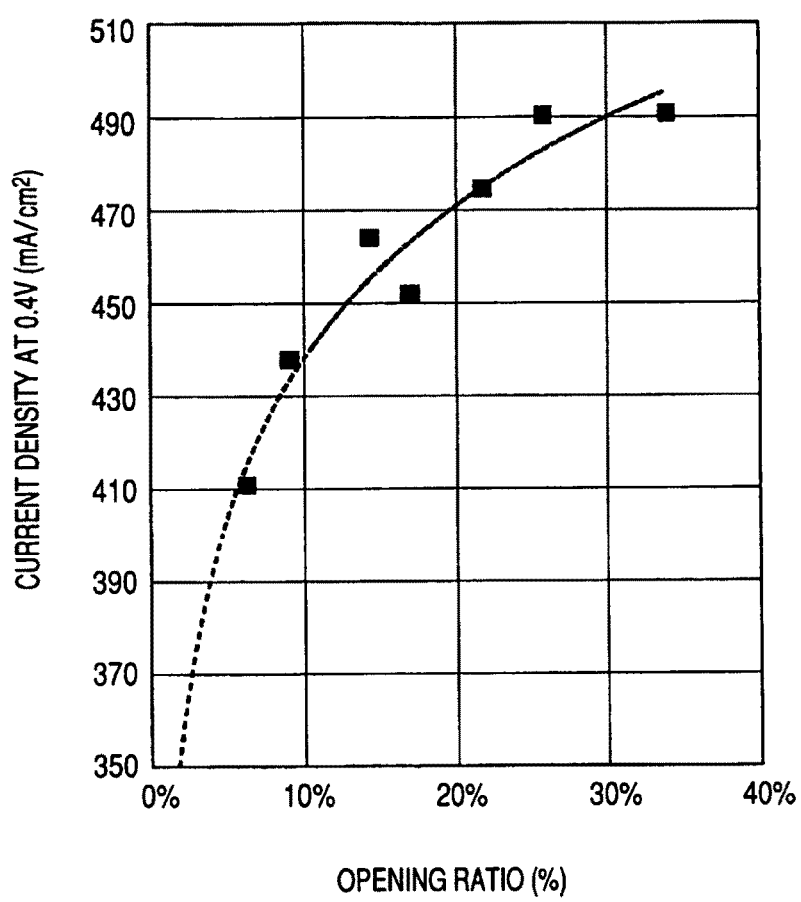
FIG. 26 illustrate a correlation between through hole opening ratios and output current densities at 0.4 V in the cathode catalyst layers of the membrane electrode assemblies according to Example 1, Comparative Example 1, and Examples 15 to 19.

FIG. 26 illustrates a correlation between a through hole opening ratio in the cathode catalyst layer of the membrane electrode assembly of each of Example 1, Comparative Example 1, and Examples 15 to 19, and an output current density at 0.4 V. From this drawing, it can be understood that an output current density is greatly improved within a range of 8% or more to 40% or less of an opening ratio of the through hole in an area surrounded with macrocracks, on a surface opposed to the polymer electrolyte membrane. It can also be understood from the drawing that an output current density suddenly drops at 8% or less, and is almost saturated at 30% or more.

Figure 27:
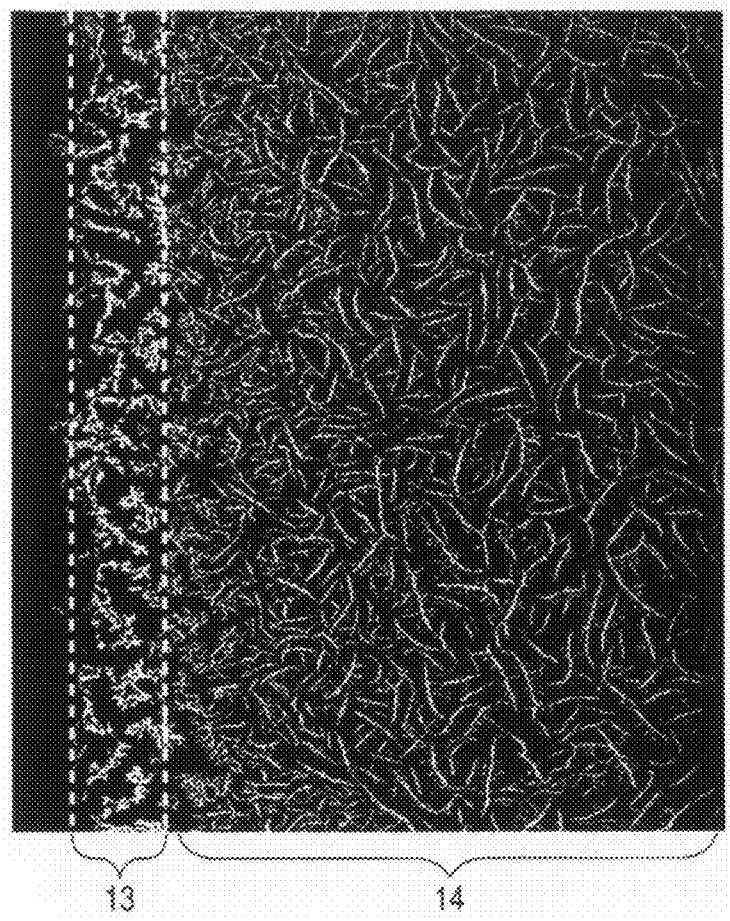
FIG. 27 illustrates a scanning electron micrograph (magnification of ×35,000) of a section of the catalyst layer according to Example 17.
Figure 28:
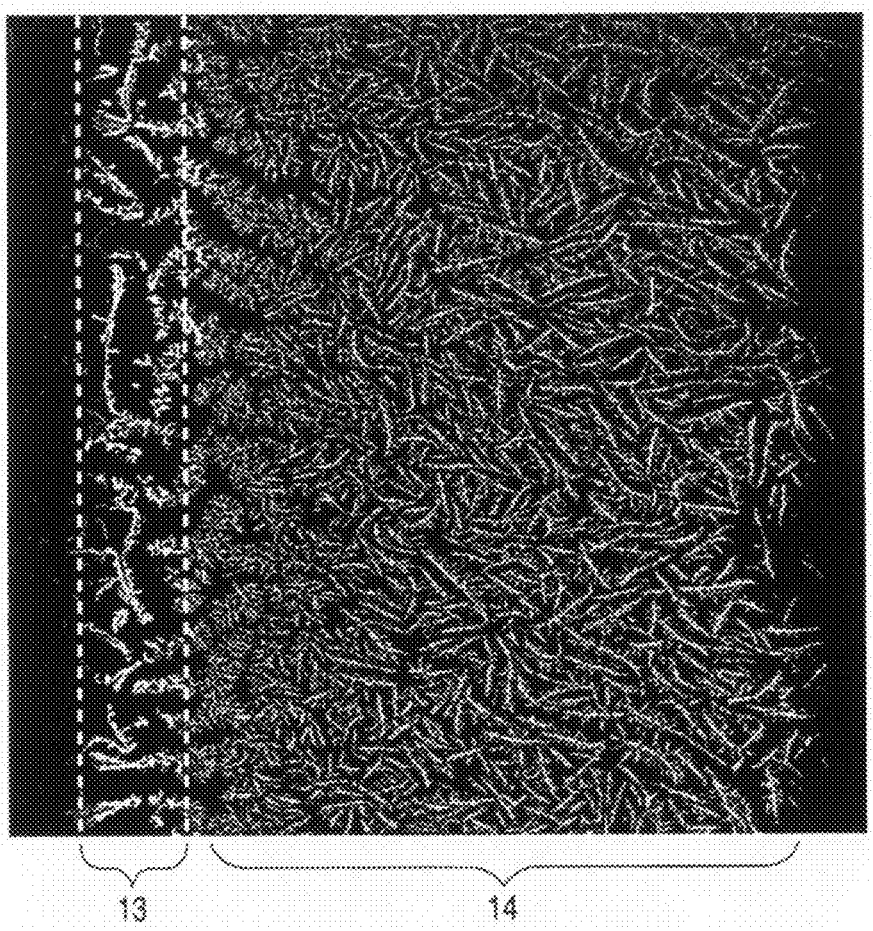
FIG. 28 illustrates a scanning electron micrograph (magnification of ×35,000) of a section of the catalyst layer of Comparative Example 1.

FIG. 27 illustrates a scanning electron micrograph of a catalyst layer cross section of Example 17, and FIG. 28 illustrates a scanning electron micrograph of a catalyst layer cross section of Comparative Example 1. A beam incident angle during FIB processing was 28° with respect to a primary plane of the catalyst layer.

In a first layer 13 of each of FIGS. 27 and 28, a line (width of 7 nm) was drawn in parallel to a primary plane of the first layer 13, and an occupation ratio of black pixels on the line to all pixels on the line was calculated as a porosity of the first layer.

The line was drawn to pass near the center in a film thickness direction of the first layer. It is because, in a sample to be observed, a first layer is not a complete flat plate in shape, causing a boundary portion between the first layer and another not to be straight, and thus, if the line is drawn near the boundary portion, the line may pass through a place which is not the first layer, disabling accurate calculation of a porosity.

A porosity of the first layer in the catalyst layer of Example 17 (FIG. 27) was 43%, which was 10% higher than that (33%) of the first layer of Comparative Example 1 (FIG. 28). When considered together with the result of FIG. 26, the first layer of Example 17 has a higher through hole opening ratio and a higher porosity than those of Comparative Example 1. Because of this structure of the first layer, it is conceivable that the catalyst layer of Example 17 has gas diffusion and generated water scattering higher than those of the catalyst layer of Comparative Example 1, and accordingly a high current density can be output.

In the second layer 14 of each of FIGS. 27 and 28, there is an area whose porosity seems to be lower than that of the first layer 13. However, in this area, the amount of ink supplied during sample adjustment may not be enough, and accordingly it can not be considered as accurate information. Thus, this area can be ignored.

According to the method for manufacturing the membrane electrode assembly and the method for the fuel cell of the embodiments of the present invention described above, the substance diffusion of the obtained membrane electrode assembly is improved, and an output reduction of the fuel cell caused by flooding of the catalyst layer is suppressed, whereby a fuel cell stably driving for a long time can be obtained. Because catalyst use efficiency can be improved, a catalyst amount to be used can be reduced, thereby reducing costs of the membrane electrode assembly and the fuel cell. Further, also according to the membrane electrode assembly and the fuel cell of the embodiments, substance diffusion of the membrane electrode assembly is improved, and an output reduction of the fuel cell caused by flooding of the catalyst layer is suppressed, whereby a fuel cell stably driving for a long time can be obtained.

This application claims the benefit of Japanese Patent Application No. 2007-155375, filed Jun. 12, 2007, which is hereby incorporated by reference herein in its entirety.

The invention claimed is:

1. A membrane electrode assembly comprising:
catalyst layers formed on both sides of a polymer electrolyte membrane, at least one of which has a dendritic shape,
wherein the at least one catalyst layer having the dendritic shape includes a macrocrack and a through hole, and an opening ratio of the through hole in an area surrounded with the macrocrack of the at least one catalyst layer having the dendritic shape in a surface opposed to the polymer electrolyte membrane is 8% or more to 40% or less, and
wherein the at least one catalyst layer having the dendritic shape has a two-layer structure of a dendritic porous layer and a dense layer, and the through hole penetrates only the dense layer.

2. The membrane electrode assembly according to claim 1, wherein a weighted average of a diameter of an area surrounded with the macrocrack corresponding to a circle is 35 µm or less, and a standard deviation of the diameter corresponding to the circle is 50% or less of the weighted average.

3. A fuel cell comprising:
the membrane electrode assembly according to claim 1; and
gas diffusion layers present on both sides of the membrane electrode assembly.

* * * * *